United States Patent

Sun

(10) Patent No.: US 12,512,679 B2
(45) Date of Patent: Dec. 30, 2025

(54) SYSTEMS AND METHODS FOR CONTROLLING HYBRID POWER DISTRIBUTION SYSTEMS

(71) Applicant: Mitsubishi Electric Research Laboratories, Inc., Cambridge, MA (US)

(72) Inventor: Hongbo Sun, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 386 days.

(21) Appl. No.: 18/220,419

(22) Filed: Jul. 11, 2023

(65) Prior Publication Data

US 2025/0023360 A1  Jan. 16, 2025

(51) Int. Cl.
*H02J 3/46* (2006.01)
*H02J 3/00* (2006.01)

(52) U.S. Cl.
CPC ........... *H02J 3/46* (2013.01); *H02J 3/003* (2020.01); *H02J 3/004* (2020.01)

(58) Field of Classification Search
CPC .... H02J 3/46; H02J 3/003; H02J 3/004; H02J 2203/10; H02J 2203/20
USPC ........................................ 700/295
See application file for complete search history.

(56) References Cited

U.S. PATENT DOCUMENTS

| | | | | |
|---|---|---|---|---|
| 8,756,047 B2* | 6/2014 | Patel | ........................ | H02J 3/06 706/16 |
| 2004/0243377 A1* | 12/2004 | Roytelman | ............... | H02J 3/06 703/18 |
| 2013/0226482 A1* | 8/2013 | Sun | ........................... | H02J 3/26 702/60 |
| 2014/0330441 A1* | 11/2014 | de Castro | ............. | H02J 3/1821 700/291 |
| 2016/0315807 A1* | 10/2016 | Peng | .................. | H04L 41/0816 |

OTHER PUBLICATIONS

P. A. N. Garcia, J. L. R. Pereira, S. Carneiro, V. M. da Costa and N. Martins, "Three-phase power flow calculations using the current injection method," in IEEE Transactions on Power Systems, vol. 15, No. 2, pp. 508-514, May 2000, doi: 10.1109/59.867133.

(Continued)

*Primary Examiner* — Jigneshkumar C Patel
(74) *Attorney, Agent, or Firm* — Gene Vinokur

(57) ABSTRACT

Power flow in a power distribution system is controlled using control commands generated based on values of system parameters. In this regard, generation prediction data, load prediction data, and real-time device status of equipment are utilized to generate scheduling data for power generation and power consumption and a network topology of the system is also obtained. The values of the system parameters are generated as an outcome of an unbalanced load flow analysis of the power distribution system using the scheduling data and the network topology. The unbalanced load flow analysis utilizes a compact multi-bus based nodal admittance model to represent relationships between nodal injected currents and nodal voltages at a plurality of non-overlapped phases of buses for a section formed by zero impedance branch connected with impedance branches in the power distribution system.

18 Claims, 20 Drawing Sheets

(56) References Cited

OTHER PUBLICATIONS

D. R. R. Penido, L. R. de Araujo, S. Carneiro, J. L. R. Pereira and P. A. N. Garcia, "Three-Phase Power Flow Based on Four-Conductor Current Injection Method for Unbalanced Distribution Networks," in IEEE Transactions on Power Systems, vol. 23, No. 2, pp. 494-503, May 2008, doi: 10.1109/TPWRS.2008.919423.

S. V. Dhople, Y. C. Chen, A. Al-Digs and A. D. Domínguez-García, "Reexamining the Distributed Slack Bus," in IEEE Transactions on Power Systems, vol. 35, No. 6, pp. 4870-4879, Nov. 2020, doi: 10.1109/TPWRS.2020.2987325.

* cited by examiner

| Iteration | Vr Mismatch (p.u.) | Vx Mismatch (p.u.) |
|---|---|---|
| 0 | 0.18794 | 0.15912 |
| 1 | 0.15916 | 0.0907 |
| 2 | 0.01933 | 0.04674 |
| 3 | 0.03765 | 0.0116 |
| 4 | 0.00648 | 0.01822 |
| 5 | 0.01617 | 0.00401 |
| 6 | 0.0039 | 0.00582 |
| 7 | 0.00343 | 0.00277 |
| 8 | 0.00334 | 0.0024 |
| 9 | 0.00296 | 0.00259 |
| 10 | 0.00196 | 0.00167 |
| 11 | 0.00177 | 0.00103 |
| 12 | 0.00091 | 0.00118 |
| 13 | 0.00099 | 0.00039 |
| 14 | 0.00055 | 0.00062 |
| 15 | 0.00051 | 0.00058 |
| 16 | 0.0005 | 0.00022 |
| 17 | 0.00022 | 0.00032 |
| 18 | 0.00022 | 0.00026 |

FIG. 9C

SYSTEMS AND METHODS FOR CONTROLLING HYBRID POWER DISTRIBUTION SYSTEMS

FIELD

This invention relates generally to power distribution systems, and more particularly to unbalanced load flow analysis of hybrid power distribution systems with multiple slack buses.

BACKGROUND

Global energy systems are facing major changes including moving from a model with centralized electricity generation in power plants towards a decentralized power grid that includes renewable energy production. Due to the further penetration of renewable energy generation into the energy markets, the conventional way of operating power systems has changed significantly. With the continuous development and deep innovation of smart power grids, more and more distributed power sources are getting integrated in power distribution networks. There are now more flexible ways of accessing the power grid with the advent of hybrid electrical power systems. In order to ensure fault free functioning of the grid, it is essential that parameters governing the power flow in power grids be maintained within acceptable norms and at prescribed levels. However, due to the distributed nature of hybrid power grids, such parameters are prone to fluctuations that may often be encountered frequently. This makes it increasingly important that such parameters be constantly monitored and maintained within acceptable limits. However, doing so conventionally has been a complex task that is often infeasible due to the complex structure of power grids, not to forget the need for sensing at all levels of production and distribution. One solution to this is by measuring and monitoring power system behaviors in a precise and accurate manner. Evaluation, monitoring, and control of the behaviors of power system is achieved by accurate unbalanced load flow analysis of the power system. Inaccurate load flow analysis results in operators failing to recognize and respond to system emergence events in a timely manner, which may lead to blackouts or shutdown or both for the entire grid.

Three-phase unbalanced load flow analysis is an essential tool for observing and analyzing behavior of an electrical power system. For example, power quality monitoring can be achieved through load flow analysis. Maintaining the power load on each phase to be within a given percentages of each other is always desired. Three-phase load flow can report on differences between phases and send alerts when the differences exceed permissible thresholds. With increasing penetration of renewable generations into distribution systems, accurate load flow analysis for adequate capturing of system behaviors is becoming a challenging task.

There are many challenges affecting the accuracy of load flow analysis in such hybrid power systems. For example, bidirectional power flows caused by distributed generations has made it important to consider the distribution systems at different voltage-levels when analyzing the load flow distribution within the systems at different voltage levels. Also, with integration of distribution systems at different voltage levels together, it is difficult to find a single bus with enough capacity to take care of the slack of integrated systems, and the slack has to be shared by multiple generators. Accordingly, to ensure efficient and continuous power flow in power distribution systems with distributed generations, better ways for determining and analyzing load flows for the power distribution systems are needed.

SUMMARY

Load flow analysis or power flow analysis is the computational procedure for determining the steady state operating characteristics of a power system network from the given branch (including line, switch, phase jumper, transformer, and regulator) data and bus data. It is one of the basic power system analyses in the stage of planning, design, and operation of power systems. It is used to calculate the steady state performance of the power system under various possible operating conditions and study the effects of changes in equipment configuration. Load flow analysis involves solving a set of simultaneous nonlinear algebraic power equations for the two unknown variables voltage magnitude and phase angle ($|V|$ and $\angle \delta$) at each node in a system.

Load flow analysis is used for various purposes including validation and checking of the operation of an existing system under normal or outage conditions to see if the existing system is capable of supplying the planned additional loads or to check and compare new alternatives for system additions to supply the new loads or improve the system performance. Load flow analysis provides values of various system parameters such as active and reactive power flow, maximum and minimum current flow in a branch circuit, terminal voltages of all buses, power factor, percentage loading of transformer and generators, system losses, transformer tap settings, voltage angles, line losses and slack bus power. Performing a load flow study on a power system recommends optimized operation of the power system. Some methods used for load flow analysis include the Gauss-Seidel method, the Newton-Raphson method and the Fast Decoupled method.

A balanced three-phase load refers to a condition when all three phases carry the same magnitude of current along with the same phase differences. An unbalanced load refers to the condition when unequal currents are carried by the three phases. Inaccurate load flow analysis in a power distribution system may result in equipment damage and incorrect control measures being adopted which in turn may render failure in recognizing and responding to system emergence events in a timely manner. Accordingly, it is a realization of some example embodiments that unbalanced load flow analysis is an essential tool for determining power distribution system's behavior which can be utilized to achieve optimized goals pertaining to electricity distribution and power supply. For example, three-phase load flow can be utilized to report on differences between phases, send alerts and/or initiate control actions when such differences exceed permissible limits.

Some example embodiments realize that power distribution systems at different voltage levels may have different phase and neutral configurations. For example, a low-voltage distribution system may be configured as three-phase four-wire systems, and its substation may connect to a medium-voltage distribution system which may be configured as three-phase three-wire systems. The neutral grounding configurations for three-wire systems are completely different than ones of four-wire systems. Some example embodiments also realize that conventionally, three-phase three-wire load flow approaches lack the capability of exact analysis of four-wire low-voltage systems due to the approximation of merging the neutral wire admittance into the phase wire admittances. Such an approximation may not be desirable when neutral wire and grounding effects need to be assessed, for example in the presence of single-phase renewable power injection that may cause a significant level of network unbalance.

Some example embodiments also realize that a single slack bus model is not valid with hybrid power distribution systems. The integration of distribution systems at different voltage levels together makes it difficult to find a single bus with enough capacity to take care of the slack of integrated systems, and the slack has to be shared by multiple generators located at different buses. It is therefore a realization of some example embodiments that distributed slack bus model needs to be adopted, and specialized measures are needed to coordinate effective power sharing among participants in a power distribution system.

Some example embodiments realize that a sparse formulation for the solution of unbalanced three-phase three-wire power systems using the Newton-Raphson method is not applicable for effectively handling a hybrid three-wire and four-wire system. Some example embodiments are based on the realization that a three-phase four-wire current injection method by applying the Newton-Raphson method to solve the set of nonlinear current injection equations is also not applicable for effectively handling a hybrid three-wire and four-wire system.

Some example embodiments realize that the convergency of component-based methods, such as backward/forward sweep algorithm heavily depends on the initial settings for variables to be solved. Also, some example embodiments realize that system-based method, such as Newton-Raphson algorithm require heavy computation. Accordingly, example embodiments provide a hybrid system-based and component-based approach, in which system-based algorithm is used for load flow initialization with known scheduled settings for generations, loads and voltages, and component-based algorithm is used for load flow update after receiving real-time updates for generations and loads.

Towards these ends, example embodiments provide systems and methods for analyzing load flows of hybrid electric power systems for evaluating, monitoring, and controlling behavior of such hybrid electric power systems. Some example embodiments provide measures for unbalanced load flow analysis for a power distribution system. Some example embodiments provide measures for controlling one or more parameters governing behavior of such a power distribution system according to outcomes of the unbalanced load flow analysis.

Some example embodiments are directed towards a three-phase unbalanced load flow method for hybrid three-wire and four-wire power distribution systems with distributed slack buses for accurate estimation of system states under various phases and neutral configurations. The real-time load flows are obtained through a hybrid component-based solution and system-based solution strategy. The inverses of a non-squared mutual admittance matrices are replaced with a corresponding squared admittance matrix products of mutual admittance matrices. The singular admittance inverse is obtained by using a modified singular value decomposition. A combined three-bus nodal current model is used by merging a zero-impedance branch with a non-zero impedance branch with inconsistent phase sets among each other. Residual active and reactive powers are embedded into component-based algorithm and system-based algorithm to model the contributions of distributed slack buses for mitigating global power imbalances and local voltage deviations.

Some example embodiments are directed towards a combined system and component based three-phase unbalanced load flow method for hybrid 3-wire and 4-wire distribution systems, in which neutral wires are explicitly modelled similarly as phase wires, and neutral groundings are modelled as equivalent grounding admittances which are determined based on rated measuring accuracy and short-circuit currents particularly for ungrounded and solid grounded scenarios. The admittance matrix of a transformer is determined through relating currents and voltages outer high-end and low-end terminals with ones of all internal high-end and low-end terminals that enable modelling transformer neutral impacts more accurately. Different than conventional three-phase three-wire load flow methods which fail to provide currents on the neutral wires and voltages at neutral grounding points, the disclosed method explicitly models the neutral configurations of distribution systems, which can be used to monitor and control distribution system operation and control more effectively. Some example embodiments model different phase connections of generators, loads and capacitors explicitly, thus greatly improving the accuracy of load flow solutions by replacing with approximate phase to ground connections used by conventional methods.

To enable solving load flows using component-based algorithms, some example embodiments replace the inverse of mutual admittances of non-zero impedance branch with different phase numbers at terminal buses with the inverse of products of the study mutual admittances with mutual admittances at corresponding reverse orders of terminal buses of the study admittances. By doing so, the impacts of non-invertible non-square matrices are represented with invertible square matrices by multiplications of mutual admittance matrices. To improve the convergence for load flow iterations and consistence of solutions, some example embodiments utilize a modified singular value decomposition algorithm to solve the inverse of singular mutual admittance matrices or products of admittance multiplication. The zero values of diagonal matrix containing the square roots of eigenvalues are replaced with small values defined by the maximum and minimum absolute values of admittance matrices under study.

To enable solving load flows using system-based algorithms, some example embodiments comprise merging zero-impedance branches with adjacent non-zero impedance branches to be considered. Taking into consideration the possibility of bidirectional flows, some example embodiments choose the adjacent branch as one of non-zero impedance branches having common terminal with the zero-impedance branch and phases presenting at the common terminal viewing from the non-zero branch include all phases presenting at the common terminal viewing from the zero-impedance branch. Some example embodiments utilize a three-bus based nodal admittance model to represent the relationship between nodal injected currents and branch currents injected from three buses, in which the corresponding nodes of three buses includes full phases of terminal bus of zero-impedance branch opposite to the common bus, full phases of terminal bus of impedance branch opposite to the common bus, and unmatched phases of common bus viewing from non-zero impedance branch.

Different than conventional load flow methods wherein only one slack bus is selected to absorb all system loss and mismatches which is not practical for distribution systems with high penetration of renewables, some example embodiments disclosed herein utilize multiple buses serving as the slack buses to share the system power imbalance and loss among participating distributed generators, such as synchronous generators and grid forming inverters with limited but sufficient generation capacities. Besides scheduled active powers for serving active powers of load demands, the participating generators provide residual active power according to global participating factors defined by corresponding active power droop control ecoefficiencies. Meanwhile, in addition to the scheduled reactive powers for serving reactive powers of load demands, the participating generators provide residual reactive powers according to global and local participating factors defined by corresponding reactive power droop control ecoefficiencies. The residual reactive powers include two parts, one is for mitigating global reactive power imbalance and loss for the whole system, and the other is for mitigating local voltage deviations from scheduled settings.

Some example embodiments provide a component-based load flow algorithm with capability for modeling multiple slack buses by extending from conventional backward/forward sweep algorithm. In some example embodiments, in such an algorithm residual active and reactive power updates are included into the backward sweep steps based on the updated node injected currents at the root node, and the voltage deviations at voltage regulated buses.

Some example embodiments provide a system-based load flow algorithm extending from conventional Newton-Raphson algorithm, and with the capability for modeling multiple slack buses. In some example embodiments such an algorithm comprises embedding active and reactive powers into nodal power balance equations, and two additional equations for active and reactive residual power imbalances are added into load flow formulations. The load flows are obtained by solving the formulated equations in terms of nodal voltage magnitudes and phase angles, and residual active and reactive powers shared by distributed slack buses.

In order to achieve the aforementioned objectives and advantages, some example embodiments provide systems, methods, and programs for controlling a power distribution system.

For example, some example embodiments provide a control system for controlling power flow in a power distribution system. The control system comprises circuitry configured to accept input data pertaining to generation prediction data indicative of power generation by a plurality of power sources over a finite time horizon, load prediction data indicative of power consumption by a plurality of loads, and device status data of one or more equipment in the power distribution system. The control system generates scheduling data for scheduling power generation by one or more of the plurality of power sources and for scheduling power consumption by one or more of the plurality of loads, based on the generation prediction data and the load prediction data. The control system also determines a network topology for the power distribution system, based on equipment status updates acquired from protection devices for the power distribution system, and determines values of one or more system parameters for the power distribution system. The one or more system parameters include dispatched power generations, dispatched load demands, branch currents, and bus voltages for the power distribution system. The control system determines these parameters by executing an unbalanced load flow analysis for the power distribution system using the scheduling data and the network topology. The unbalanced load flow analysis utilizes a compact multi-bus based nodal admittance model to represent relationships between nodal injected currents and nodal voltages at a plurality of non-overlapped phases of buses for a section formed by zero impedance branch connected with impedance branches in the power distribution system. The control system generates one or more commands for controlling the power distribution system, based on the determined values of the one or more system parameters.

Some example embodiments also provide a computer-implemented method for controlling power flow in a power distribution system. The method comprises steps of accepting input data comprising generation prediction data indicative of power generation by a plurality of power sources over a finite time horizon, load prediction data indicative of power consumption by a plurality of loads, and real-time device status data of one or more equipment in the power distribution system. The method also comprises generating scheduling data for scheduling power generation by one or more of the plurality of power sources and for scheduling power consumption by one or more of the plurality of loads, based on the generation prediction data and the load prediction data. The method also comprises determining a network topology for the power distribution system, based on equipment status updates acquired from protection devices for the power distribution system, and determining values of one or more system parameters for the power distribution system. The parameters include dispatched power generations, dispatched load demands, branch currents, and bus voltages for the power distribution system. The parameters are determined by executing an unbalanced load flow analysis for the power distribution system using the scheduling data and the network topology. The unbalanced load flow analysis utilizes a compact multi-bus based nodal admittance model to represent relationships between nodal injected currents and nodal voltages at a plurality of non-overlapped phases of buses for a section formed by zero impedance branch connected with impedance branches in the power distribution system. The method also comprises generating one or more commands for controlling the power distribution system, based on the determined values of the one or more system parameters.

BRIEF DESCRIPTION OF DRAWINGS

The presently disclosed embodiments will be further explained with reference to the following drawings. The drawings shown are not necessarily to scale, with emphasis instead generally being placed upon illustrating the principles of the presently disclosed embodiments.

FIG. 9C illustrates a convergence example of the method for load flow analysis of FIGS. 9A and 9B, according to some example embodiments;

Figure 1A:
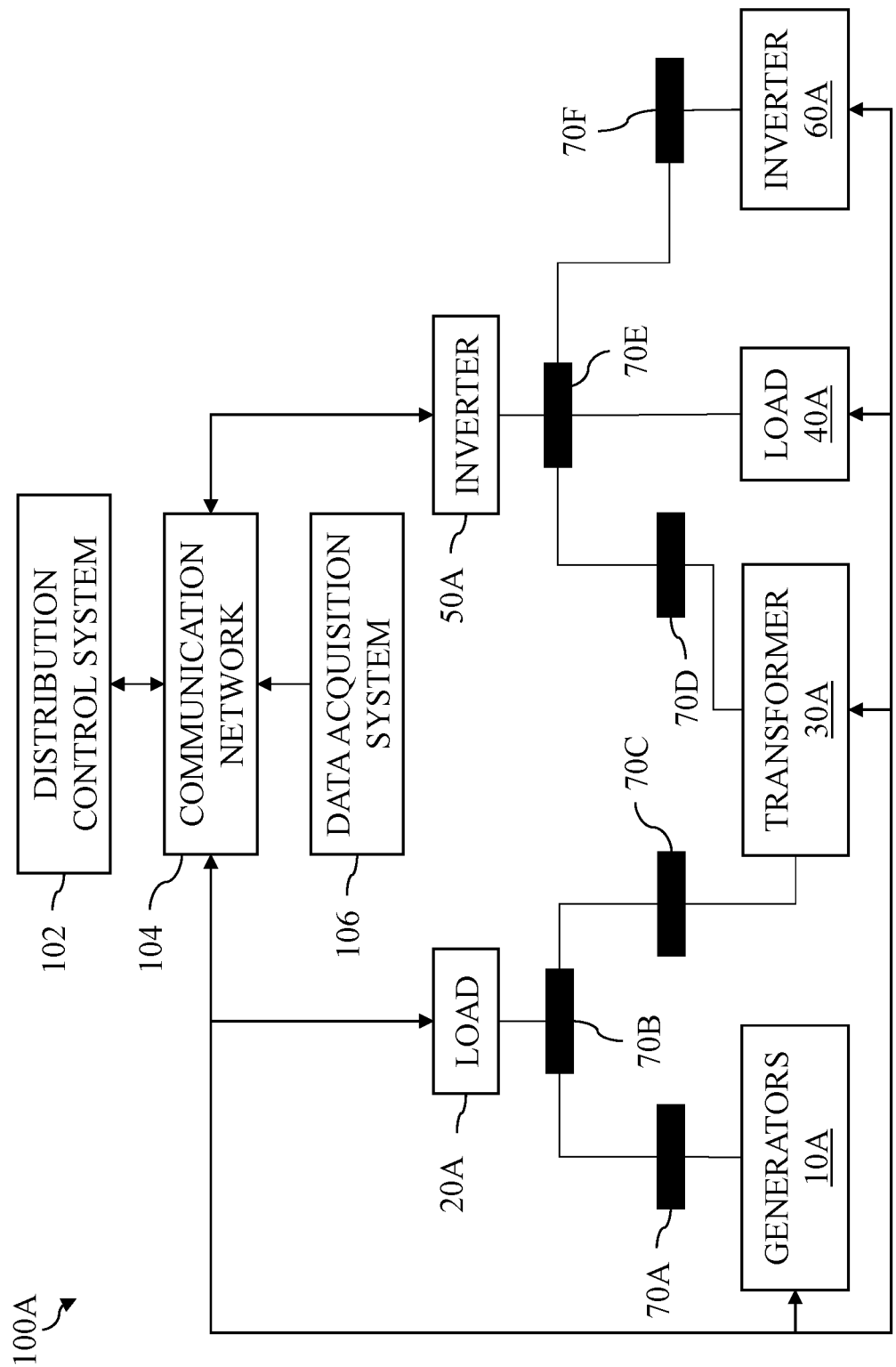
FIG. 1A illustrates a schematic diagram of a power distribution system controlled by a distribution control system, according to some example embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Renewable resources of energy are finding more and more acceptance in today's world due to ecological and environmental concerns arising out of depletion of non-renewable resources. Such adoption of clean energy sources is more prevalent in the electrical energy industry. With the increased penetration of renewable sources of electricity in power grids, there has been major challenges thrown due to complexities and non-homogeneity of renewable electricity sources and conventional energy sources in such hybrid power distribution systems. For example, renewable sources of electricity are usually variable in terms of power output, voltage output, frequency of output current, and availability hours in a day. A solar power plant may supply low or no electricity in certain operating conditions. As such, the power grid needs to ensure there are measures in place to cater to such changes arising out of the spontaneity and variance in the power supplied by renewable sources.

Electrical energy is usually generated and/or supplied in three phases owing to several operational advantages. For transmission purposes such three phase power supply adopts three-wire or four wire supply systems. In order to ensure smooth operation of a power distribution system, it is necessary to perform load flow analysis for proper planning and uninterrupted operations. Power transmission/distribution systems become unbalanced when the source voltages and/or load impedances in the system are unequal. For example, the voltage sources may not be equal in magnitude and/or have differences in phase angle from each other's phase. In another example, the load impedances may be unequal from each other. The difference in voltage and/or load impedance causes the power distribution system to become unbalanced. On the other hand, balanced systems will always have equal voltage sources in magnitude and phase angle difference (for example, a three-phase system with a voltage source at 4.16 kV for each phase, and 120 degrees apart for any two phases) and equal load impedance (for example, a three-phase system with only resistive loads or inductive loads or capacitive loads with the same value for all lines).

Some ill effects of unbalanced three-phase systems include increased heat by three-phase motors, reduced lifetime of machine by increased heat production, power losses $I^2R$ increased, and motor drives becoming unreliable. As such, it is important that an accurate load flow analysis be carried out for such unbalanced power distribution systems otherwise it may result in operators failing to recognize and respond to system emergence events in a timely manner, which may further cause blackouts to broader extent. Some examples of system emergence events include equipment damage due to unbalanced load impedance or source voltages, burnout of equipment due to increased heat production, significant power loss causing line failures and the like. Three-phase unbalanced load flow analysis is widely used in distribution systems. For example, power quality monitoring can be achieved through load flow analysis. Maintaining the power load on each phase to be within a given percentages of each other is a good practice. Three-phase load flow can report on differences between phases and send alerts when the differences exceed a predetermined percentage.

Since load impedance is highly variable in a power distribution system, one of the primary reasons for a three-phase system to become unbalanced is when the load impedance in one line is not equal to that in the other lines. This is because the line for which the load impedance is unequal will consume a different current than the other two lines. Such unbalanced systems may be analyzed using the standard methodologies applying mesh or node analysis. However, with introduction of hybrid power distribution systems, it is very likely that one or more voltage sources in the power distribution system may differ in terms of supplied voltage magnitude and/or active/reactive powers with other voltage sources in the power distribution system. This complicates the unbalanced load flow analysis process and makes it highly cumbersome and/or nearly impossible for hybrid three-wire and four wire power distribution systems, especially given the fact that such systems have multiple slack buses.

There are many challenges that affect the accuracy of load flow analysis of unbalanced power distribution systems. The first one is due to bidirectional flows caused by distributed generations, where the distribution systems at different voltage-levels have to be considered together when analyzing the load flow distribution within the systems at different voltage levels. Distribution systems at different voltage levels may have different phases and neutral configurations. For example, a low-voltage distribution system may be configured as three-phase four-wire systems, and its substation may connect to a medium-voltage distribution system which may be configured as three-phase three-wire systems. The neutral grounding configurations for three-wire systems are completely different than ones of four-wire systems. Conventionally three-phase 3-wire load flow approach lacks the capability of exact analysis of 4-wire low-voltage systems due to the approximation of merging the neutral wire admittance into the phase wire admittances. Such an approximation may not be desirable when neutral wire and grounding effects need to be assessed, especially in the presence of single-phase renewable power injection that may cause a significant level of network unbalance. Another challenge affecting the accuracy of load flow analysis of unbalanced power distribution systems is that a single slack bus model is not valid anymore. With integration of distribution systems at different voltage levels together, it is difficult to find a single bus with enough capacity to take care of the slack of integrated systems, and the slack has to be shared by multiple generators.

Some example embodiments described herein provide a three-phase unbalanced load flow method for hybrid three-wire and four-wire power distribution systems with distributed slack buses for more accurate estimation of system states under various phases and neutral configurations. The real-time load flows are obtained through a hybrid component-based solution and system-based solution strategy. The inverses of a non-squared mutual admittance matrices are replaced with corresponding squared admittance matrix products of mutual admittance matrices. The singular admittance inverse is obtained by using a modified singular value decomposition. A combined three-bus nodal current model is used by merging a zero-impedance branch with a non-zero impedance branch with inconsistent phase sets among each other. Residual active and reactive powers are embedded into component-based algorithm and system-based algorithm to model the contributions of distributed slack buses for mitigating global power imbalances and local voltage deviations.

These and other principles of various example embodiments will be described herein. First a description of the structure and operation of a power distribution system utilizing some principles of a novel distribution control is described. The description proceeds to explanation of the underlying load flow analysis algorithms and parameters utilized.

FIG. 1A illustrates a schematic diagram of a power distribution system 100A controlled by a distribution control system 102, according to some example embodiments. The power distribution system 100A comprises the distribution control system 102 communicatively coupled through a communication network 104 to a data acquisition system 106. The data acquisition system 106 is communicatively coupled with electrical components of the power distribution system 100A through the communication network 104. In this regard, the data acquisition system 104 obtains sensor data and operational data related to working and operation of the electrical components of the power distribution system 100A. The power distribution system 100A also comprises one or more generators 10A, one or more loads 20A, one or more transformers 30A, one or more loads 40A, one or more inverters 50A, and one or more inverters 60A. The generators 10A, loads 20A and 40A, and inverters 50A and 60A are electrically coupled with each other through a plurality of buses 70A, 70B, 70C, 70D, 70E and 70F. Additionally, the generators 10A, loads 20A and 40A, and inverters 50A and 60A are communicatively coupled to the data acquisition system 106 and the distribution control system 102 through the communication network 104. Towards this end, it may be contemplated that each of the generators 10A, loads 20A and 40A, and inverters 50A and 60A are equipped with suitable electronics for gathering operational and attribute data of respective components. For example, the suitable electronics may capture and/or provide values of loads in terms of currents, voltages, power drawn, values of generators output, rotation per minute, frequency of alternating current, primary winding voltage and secondary winding voltages and the like.

The distribution control system 102 comprises circuitry for gathering, transferring, and processing data. Additionally, the distribution control system 102 may comprise a suitable storage medium for storing data and computer programs. The distribution control system 102 may periodically process data and issue control commands and/or corrective actions directed towards balancing the power flow in the power distribution system whenever the system goes unbalanced. The communication network 104 may comprise one or more medium for allowing data communication amongst the components of the power distribution system 100A. The data acquisition system 106 comprises suitable interfaces, sensing circuitry, transducers and the like for gathering data from the other components of the power distribution system 100A.

Loads 20A and 40A may be any type of resistive, inductive or capacitive load in a power grid. Generators 10A may be any source of dispatchable electrical energy such as hydro-power generators, coal powered generators, diesel generators, or gas-powered generators. According to some example embodiments, generators 10A may be synchronous generators. Generators 10A provide scheduled active powers for serving active powers of load demands, and may provide residual active powers according to global participating factors defined by corresponding active power droop control ecoefficiencies as well. According to some example embodiments, in addition to the scheduled reactive powers for serving reactive powers of load demands, the participating generators 10A may provide residual reactive powers according to global and local participating factors defined by corresponding reactive power droop control ecoefficiencies. The residual reactive powers include two parts, one for mitigating global reactive power imbalance and loss for the whole system, and the other for mitigating local voltage deviations from scheduled settings.

Transformer 30A may include a step up or step-down transformer optionally coupled with the loads 20A, 40A and the generators 10A. Lines/links connected bus pairs from available buses 70A-70F may include 3 wire and/or 4 wire architecture supporting power transmission across the components. Multiple buses from 70A-70F serving as the slack buses, share the system power imbalance and loss among the participating distributed generators, such as the synchronous generators 10A and the grid forming inverters 50A and 60A with limited but sufficient generation capacities. Inverters 50A and 60A may include grid-forming inverters that supply power in the system thereby making the power distribution system a hybrid one.

An aspect of some example embodiments includes explicitly modelling neutral groundings as equivalent grounding admittances which are determined based on rated measuring accuracy and short-circuit currents particularly for ungrounded and solid grounded scenarios. The admittance matrix of a transformer may be determined through relating currents and voltages of outer high-end and low-end terminals with ones of all internal high-end and low-end terminals that enable modelling transformer neutral impacts more accurately.

Figure 1B:
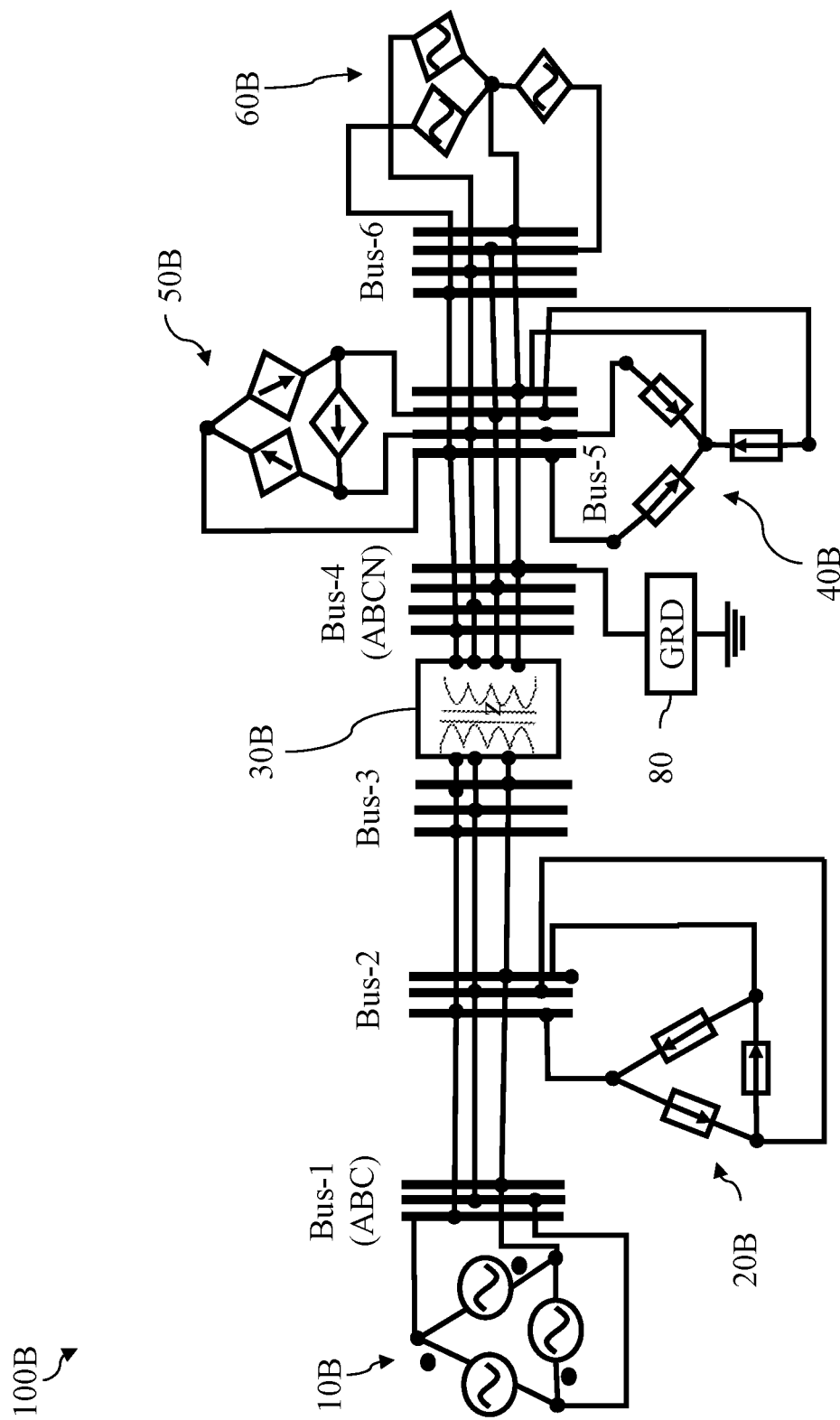
FIG. 1B illustrates an exemplar hybrid power distribution system, according to some example embodiments.

FIG. 1B illustrates an exemplary hybrid power distribution system 100B constructed by a combination of a three-wire configuration section and a 4-wire configuration section, according to some example embodiments. The system 100B comprises 3 buses with 3 wires, including Bus-1, Bus-2, and Bus-3. The system also comprises of 3 buses with 4 wires, including Bus-4, Bus-5 and Bus-6. The 3-wire configuration section includes only phase wires, and generators 10B and loads 20B may be Delta-connected, i.e., connected between phase wires. The 4-wire configuration section includes both phase and neutral wires, in which the neutral wire is grounded 80 at least at one location along the section, and renewable generators such as inverters 50B and 60B and their loads 40B may be Wye-connected, i.e. connected between the phase wires and the neutral wire. Generators 10B may be conventional synchronous generator, while the inverters 50B and 60B may be grid forming inverter-based generator, and grid following inverter-based generator. A transformer 30B may be used to connect between 3-wire section and 4-wire section.

Figure 2:
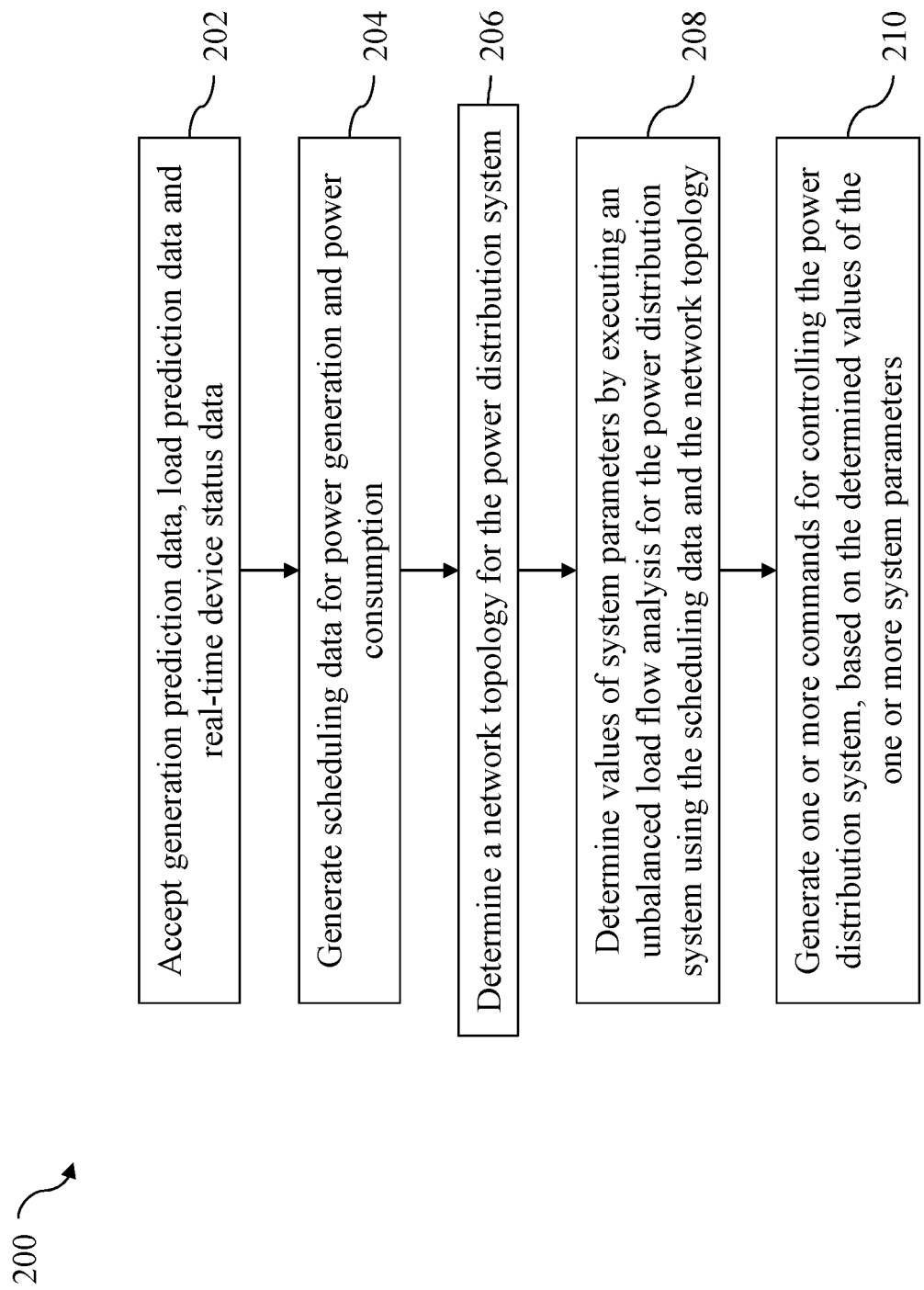
FIG. 2 illustrates a flowchart of an exemplar method for controlling a power distribution system, according to some example embodiments.

FIG. 2 illustrates a flowchart of an exemplar method 200 for controlling a power distribution system, according to some example embodiments. The method 200 comprises accepting 202 generation prediction data, load prediction data and real-time device status data associated with one or more of the power generation equipment, power consuming equipment, and power transmission equipment in the power distribution system 100B, over a time horizon. For example, the generation schedule of the generators 10B and inverters 50B, 60B over a predefined or user defined time period may be obtained as the generation prediction data. According to some example embodiments, the generation prediction data for the generators 10B and inverters 50B, 60B may be obtained from a database or directly from operators of the generators and inverters. The load prediction data may be obtained in a similar manner for example by querying a database or by directly measuring state parameters of the loads 20B and 40B over some period of time. The real-time device status of the generators, inverters, buses, transformers and the loads in the power distribution system may also be obtained through suitable means and measures such as using one or more sensors. In some example embodiments, the data accepted at step 202 may be obtained in response to one or more queries or using any suitable approach.

The method 200 also comprises generating 204 scheduling data for scheduling power generation and power consumption in the power distribution system 100B. The schedule for power generation may be generated based on the generation prediction data obtained at step 202 using economic dispatch and unit commitment to balance total power generation with total load demand known in the art. Similarly, the schedule for power consumption may be generated based on the load prediction data obtained at step 202 and weather or environment real-time updates. At step 206, method 200 comprises determining a network topology for the power distribution system 100B. The network topology may be determined based on the real time device status data, the generation prediction data and the load prediction data using connectivity analysis through all-connected tracing. According to some example embodiments, as a part of determining the network topology for the power distribution system, the method 200 may involve explicitly modelling the neutral wires as phase wires and neutral groundings as equivalent grounding admittances. The method 200 proceeds to determining 208 values of system parameters by executing an unbalanced load flow analysis for the power distribution system using the scheduling data and the network topology. In some example embodiments, the power flow in the system may be bi-directional and executing the unbalanced load flow analysis may include solving an initial load flow for the power distribution system using the scheduling data and the real-time device status data according to a system-based model. The system-based model is based on nodal admittance matrix of the power distribution system that is generated using an admittance matrix of each component and node in the network topology of the power distribution system. Each branch having an energized phase is modelled as a node and each branch having branch impedance less than or equal to a threshold is modelled as a zero-impedance branch.

The system parameters determined at step 208 include dispatched generation schedules and dispatched loads for system operators/dispatchers to maintain power balance of power distribution systems, branch currents/power flows and bus phase voltages to maintain system security and good service quality. A detailed discussion of the unbalanced load flow analysis is described later in this disclosure. Based on the results of the unbalanced load flow analysis, the one or more system parameters thus determined are used to take corrective actions for the power distribution system. In this regard, the method comprises generating 210 one or more commands for controlling the power distribution system, based on the determined values of the one or more system parameters. For example, where the result of unbalanced load flow analysis indicates that the voltage supplied by one or more generators is falling below a threshold, control commands directed towards increasing the power production and/or reducing the load in the respective branch of the power distribution system may be generated and provided to the concerned equipment so as to balance the power flow in the system in a timely manner.

Figure 3:
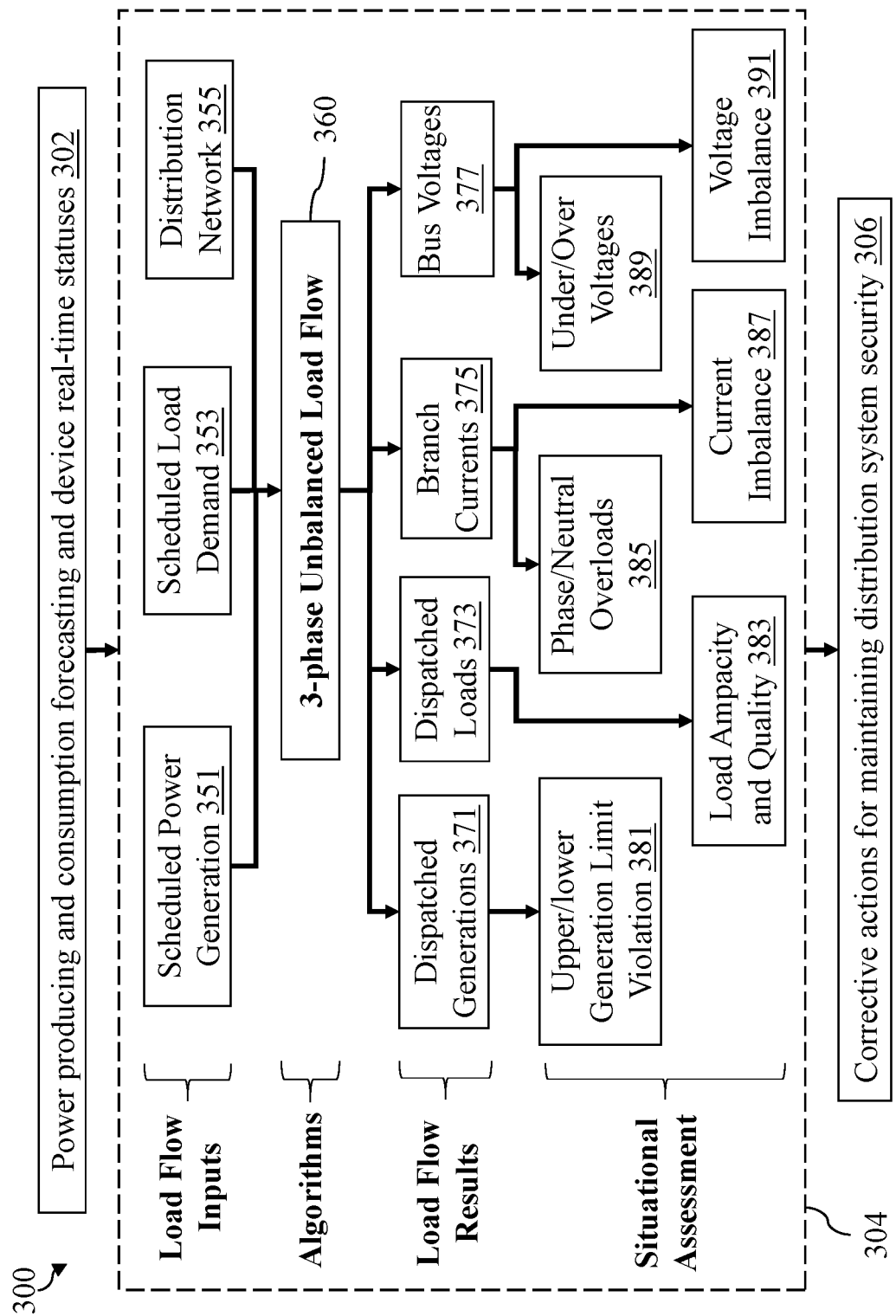
FIG. 3 illustrates a workflow for controlling power flow in a power distribution system using unbalanced load flow, according to some example embodiments.

FIG. 3 illustrates a workflow 300 for controlling power flow in a power distribution system such as the system 100B of FIG. 1B using unbalanced load flow, according to some example embodiments. Particularly, workflow 300 shows different inputs and outputs of the unbalanced load flow analysis method 304. Power production and consumption forecasting and device real-time statuses 302 for a time horizon are received by a distribution control system performing the unbalanced load flow analysis. Scheduled power generation data 351, scheduled load demand data 353, and topology of the grid network 355 are determined based on the data received at 302 and are provided as load flow inputs for the 3-phase unbalanced load flow analysis algorithm 360. The 3-phase unbalanced load flow analysis algorithm 360 provides dispatched generation schedules 371, dispatched loads 373, branch currents 375, and bus voltages 377 as load flow results. The amount of dispatched generations may include corresponding amounts for both scheduled generations and residual generations. The residual generation is used to cover active power loss and prediction error for scheduled generations. The dispatched loads may also slightly different than scheduled loads. For the scheduled loads are usually determined based on pre-determined voltage levels. If the loads include constant current or impedance load components, the dispatched loads will differ than scheduled ones if actual voltage levels that determined by load flow solution are different than pre-determined ones. Using these load flow results, situational assessments for the power distribution system are performed. For example, as part of the situational assessment, the dispatched generation schedules 371 may be used to determine upper/lower generation limit violation data 381 for the generators and/or inverters of the power distribution system. In some example embodiments, the dispatched loads 373 may be used to determine load ampacity and quality 383 associated with the loads of the power distribution system. In some example embodiments, the branch currents 375 may be used to determine phase/neutral overloads 385 and the current imbalance 387 in the power distribution system. Similarly, in some example embodiments, the bus voltages 377 may be used to determine under/over voltages 389 and voltage imbalances 391 in the power distribution system. The situational assessment outcomes may then be analyzed automatically or semi-automatically to suggest and/or take 306 corrective actions for maintaining distribution system security.

Modeling of Distribution Lines with 3-Wire and 4-Wire Configurations

Figure 4A:
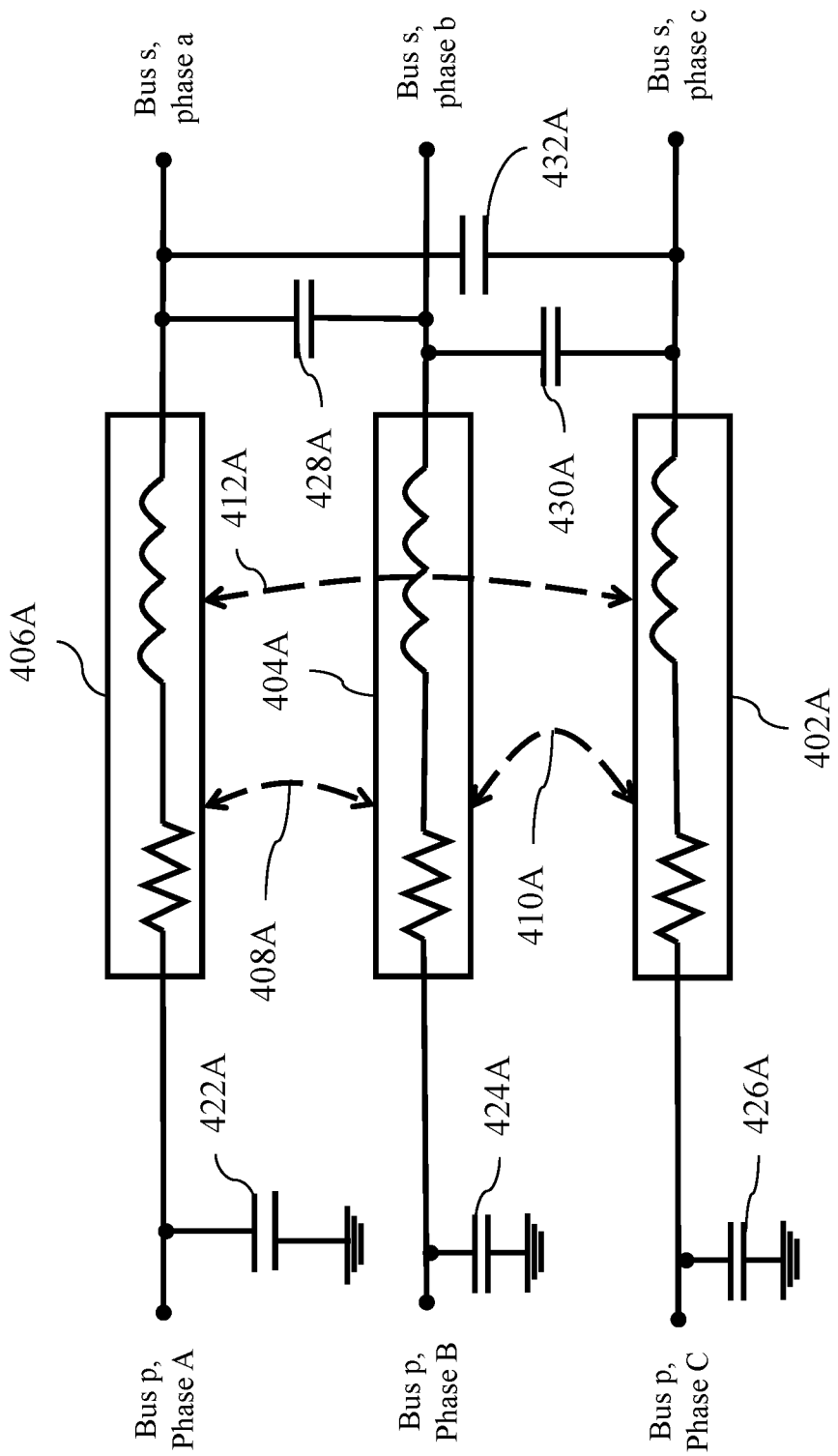
FIG. 4A illustrates a branch model for a distribution line connecting two buses with 3-wire configuration, according to some example embodiments.
Figure 4B:
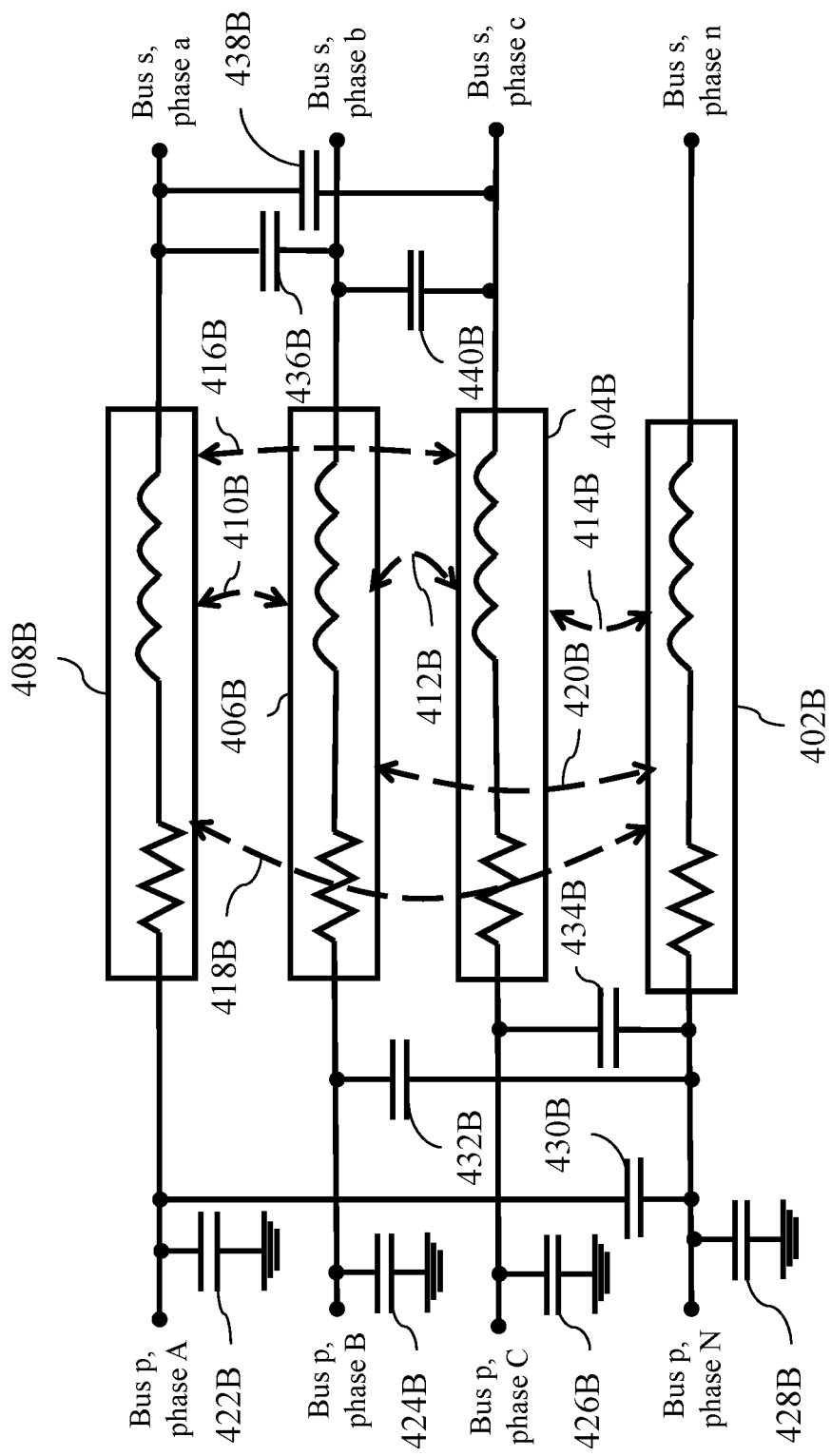
FIG. 4B illustrates a branch model for a distribution line connecting two buses with 4-wire configuration, according to some example embodiments.

With reference to FIG. 1B and in conjunction with FIGS. 4A and 4B, the detailed models for components in the distribution system 100B are described next. FIG. 4A illustrates a branch model for a distribution line connecting two buses with 3-wire configuration, according to some example embodiments. FIG. 4B illustrates a branch model for a distribution line connecting two buses with 4-wire configuration, according to some example embodiments.

A multiple-wire distribution line between a bus p and another bus s may be modeled using branch current equation:

$$\begin{bmatrix} I_{ps} \\ I_{sp} \end{bmatrix} = \begin{bmatrix} Y_{ps}^{SE} + \frac{1}{2} Y_{ps}^{SH} & -Y_{ps}^{SE} \\ -Y_{ps}^{SE} & Y_{ps}^{SE} + \frac{1}{2} Y_{ps}^{SH} \end{bmatrix} \begin{bmatrix} V_p \\ V_s \end{bmatrix} \quad (1)$$

where $I_{ps}$ and $I_{sp}$ are the $\|\Phi_p\| \times 1$ and $\|\Phi_s\| \times 1$ vectors of phase currents injected into branch ps through bus p and bus s, respectively. $\Phi_p$ and $\Phi_s$ are the available phase sets for bus p and bus s, and the available phase can be phase A, phase B, phase C, or neutral. $\|\Phi_p\|$ is the cardinality of $\Phi_p$. $\|\Phi_p\| = \|\Phi_s\|$. $V_p$ and $V_s$ are the $\|\Phi_p\| \times 1$ and $\|\Phi_s\| \times 1$ vectors of phase to ground voltages of bus p and bus s, respectively. $Y_{ps}^{SE}$ and $Y_{ps}^{SH}$ are the $\|\Phi_p\| \times \|\Phi_p\|$ series phase admittance and $\|\Phi_p\| \times \|\Phi_p\|$ shunt phase admittance, respectively. $Y_{ps}^{SE}$ is derived by inversion of a corresponding series impedance matrix, $Z_{ps}^{SE}$.

Referring to FIG. 4A, the series impedances, $Z_{sp}^{SE}$ includes self-components 402A, 404A, and 406A for each wire, and mutual components 408A, 410A, and 412A for each pair of wires. The shunt admittances of wires, $Y_{ps}^{SH}$ consists of self-components 422A, 424A, 426A for each wire, and mutual components 428A, 430A, and 432A for each pair of wires. Similarly, in the configuration shown in FIG. 4B, the series impedances, $Z_{ps}^{SE}$ includes self-components 402B, 404B, 406B, and 408B for each wire, and mutual components 410B, 412B, 414B, 416B, 418B, and 420B for each pair of wires. The shunt admittances of wires in FIG. 4B, $Y_{ps}^{SH}$ comprises self-components 422B, 424B, 426B, and 428B for each wire, and mutual components 430B, 432B, 434B, 436B, 438B, and 440B for each pair of wires.

For a 3-wire distribution line such as the one shown in FIG. 4A, its series and shunt admittance matrices can be represented using 3×3 admittance matrices, $Y_{ps}^{SE,abc}$ and $Y_{ps}^{SH,abc}$ consisting of the self-admittances of three phase wires as the diagonal elements and the mutual coupling admittances among them as off-diagonal elements:

$$Y_{ps}^{SE,abc} = \begin{bmatrix} y_{ps}^{SE,aa} & y_{ps}^{SE,ab} & y_{ps}^{SE,ac} \\ y_{ps}^{SE,ba} & y_{ps}^{SE,bb} & y_{ps}^{SE,bc} \\ y_{ps}^{SE,ca} & y_{ps}^{SE,cb} & y_{ps}^{SE,cc} \end{bmatrix} \quad (2a)$$

$$Y_{ps}^{SH,abc} = \begin{bmatrix} y_{ps}^{SH,aa} & y_{ps}^{SH,ab} & y_{ps}^{SH,ac} \\ y_{ps}^{SH,ba} & y_{ps}^{SH,bb} & y_{ps}^{SH,bc} \\ y_{ps}^{SH,ca} & y_{ps}^{SH,cb} & y_{ps}^{SH,cc} \end{bmatrix} \quad (2b)$$

If only two or one phases exists, the corresponding series and shunt admittances are reduced to a 2×2, or 1×1 matrices.

For a 4-wire distribution line such as the one shown in FIG. 4B, the fourth wire is its neutral wire. Similar to the phase wires, the neutral wire has self and mutual impedance components with the other phase wires, and these are also to be included in the admittance model. The line series and shunt admittance matrices are given below using a 4×4 matrix model, in which the neutral wire is explicitly modeled as reflected in the $4^{th}$ row and column:

$$Y_{ps}^{SE,abcn} = \begin{bmatrix} y_{ps}^{SE,aa} & y_{ps}^{SE,ab} & y_{ps}^{SE,ac} & y_{ps}^{SE,an} \\ y_{ps}^{SE,ba} & y_{ps}^{SE,bb} & y_{ps}^{SE,bc} & y_{ps}^{SE,bn} \\ y_{ps}^{SE,ca} & y_{ps}^{SE,cb} & y_{ps}^{SE,cc} & y_{ps}^{SE,cn} \\ y_{ps}^{SE,na} & y_{ps}^{SE,nb} & y_{ps}^{SE,nc} & y_{ps}^{SE,bb} \end{bmatrix} \quad (3a)$$

$$Y_{ps}^{SH,abcn} = \begin{bmatrix} y_{ps}^{SH,aa} & y_{ps}^{SH,ab} & y_{ps}^{SH,ac} & y_{ps}^{SH,an} \\ y_{ps}^{SH,ba} & y_{ps}^{SH,bb} & y_{ps}^{SH,bc} & y_{ps}^{SH,bn} \\ y_{ps}^{SH,ca} & y_{ps}^{SH,cb} & y_{ps}^{SH,cc} & y_{ps}^{SH,cn} \\ y_{ps}^{SH,na} & y_{ps}^{SH,nb} & y_{ps}^{SH,nc} & y_{ps}^{SH,bb} \end{bmatrix} \quad (3b)$$

Similarly, if only two or one phase wires exists, the corresponding series and shunt admittances are reduced to a 3×3, or 2×2 matrices.

For a generalized impedance branch between bus p and bus s, its branch current equation can be described as:

$$I_{ps} = Y_{pp} V_p + Y_{ps} V_s \quad (4a)$$

$$I_{sp} = Y_{sp} V_p + Y_{ss} V_s \quad (4b)$$

or in compact form as:

$$\begin{bmatrix} I_{ps} \\ I_{sp} \end{bmatrix} = \begin{bmatrix} Y_{pp} & Y_{ps} \\ Y_{sp} & Y_{ss} \end{bmatrix} \begin{bmatrix} V_p \\ V_s \end{bmatrix} \quad (4c)$$

If $Y_{ps}$ and $Y_{sp}$ are of square matrices, the above equation 4c may be used to derive the phase-to-ground voltages and injected phase currents at opposite terminal bus if ones at one terminal bus are given.

When the currents and voltages at bus p are given, the currents and voltages may be obtained at receiving bus s as:

$$\begin{bmatrix} V_s \\ I_{sp} \end{bmatrix} = \begin{bmatrix} -Y_{ps}^{-1} Y_{pp} & Y_{ps}^{-1} \\ Y_{sp} - Y_{ss} Y_{ps}^{-1} Y_{pp} & Y_{ss} Y_{ps}^{-1} \end{bmatrix} \begin{bmatrix} V_p \\ I_{ps} \end{bmatrix} \quad (5)$$

When the currents and voltages at bus s are given, the currents and voltages at sending bus p may be obtained as:

$$\begin{bmatrix} V_p \\ I_{ps} \end{bmatrix} = \begin{bmatrix} -Y_{sp}^{-1} Y_{ss} & Y_{sp}^{-1} \\ Y_{ps} - Y_{pp} Y_{sp}^{-1} Y_{ss} & Y_{pp} Y_{sp}^{-1} \end{bmatrix} \begin{bmatrix} V_p \\ I_{sp} \end{bmatrix} \quad (6)$$

Equations (5) and (6) define current and voltage allocation matrices using converted branch admittance matrices when mutual admittance matrices are squared matrices.

Considering $Y_{ps}$ or $Y_{sp}$ may be singular or close to singular for some devices, such as transformers with specific connections, the singular value decomposition (SVD) is modified to compute the inverse of a matrix.

For a n×n square complex matrix Y, it can be broken down into the product of three matrices—an n×n orthogonal matrix U, a n×n diagonal matrix S, and the conjugate of the transpose of an n×n orthogonal matrix V:

$$Y = U \cdot S \cdot \text{conjugate}(V^T) \quad (7a)$$

where $U^T U = 1$, $V^T V = 1$, I is a n×n identity matrix, the columns of U are orthonormal eigenvectors of $YY^T$, the columns of V are orthonormal eigenvectors of $Y^T Y$, and S is a diagonal matrix containing the square roots of eigenvalues from U or V in descending order.

$$S = [\text{diag}(\omega_j)] = \begin{bmatrix} \omega_1 & & \\ & \ddots & \\ & & \omega_n \end{bmatrix}, \omega_1 \geq \omega_2 \geq \cdots \geq \omega_n \geq 0. \quad (7b)$$

Then the inverse matrix of Y, $Y^{-1}$ can be computed as:

$$Y^{-1} = V \cdot \left[ \text{diag}\left(\frac{1}{\omega_j}\right) \right] \cdot \text{conjugate}(U^T) \quad (8)$$

If Y is singular, some of its eigenvalues will become zeros, and S becomes:

$$S = [\text{diag}(\omega_j)] = \begin{bmatrix} \omega_1 & & & & \\ & \ddots & & & \\ & & \omega_m & & \\ & & & 0 & \\ & & & & \ddots \\ & & & & & 0 \end{bmatrix} \quad (9a)$$

Matrix S can be replaced with an approximate matrix by replacing the square roots of zero eigenvalues with a small positive number E:

$$S = [\text{diag}(\omega_j)] = \begin{bmatrix} \omega_1 & & & & \\ & \ddots & & & \\ & & \omega_m & & \\ & & & \epsilon & \\ & & & & \ddots \\ & & & & & \epsilon \end{bmatrix} \quad (9b)$$

where $\epsilon$ is determined based on the maximum and minimum absolute element values of Y:

$$\epsilon = \min\left\{ \frac{1}{\max_{i,j} |Y_{ij}|}, \min_{i,j} |Y_{ij}| \right\} \quad (9c)$$

Neutral Representation for Different Grounding Systems

Some example embodiments explicitly model each phase including the neutral for each bus. Each neutral is connected to the ground through an equivalent admittance whose value is determined or approximated based on the neutral grounding scenarios.

Figures 5A, 5B:
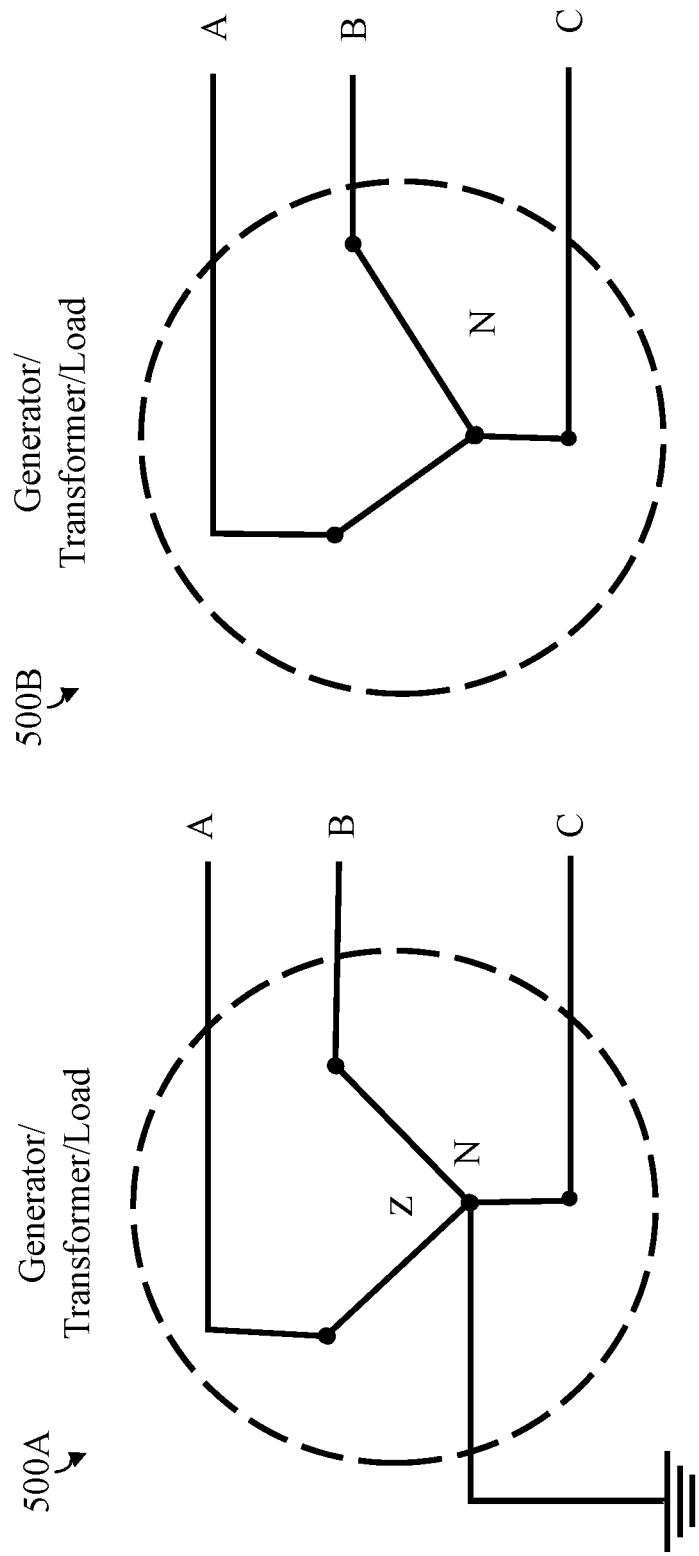
FIGS. 5A, 5B and 5C illustrate three typical neutral grounding scenarios, according to some example embodiments.
Figure 5C:
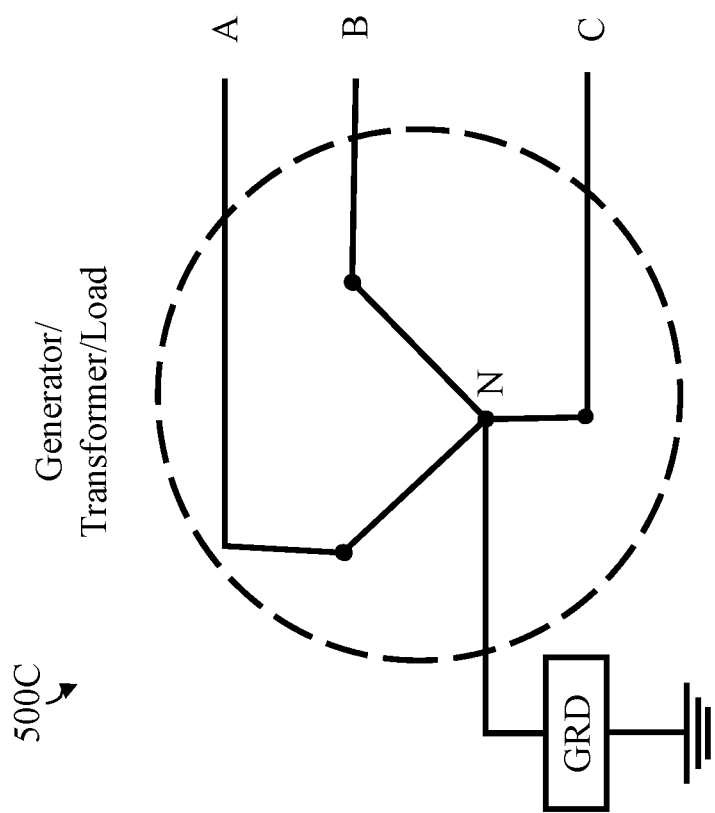

FIG. 5A, FIG. 5B and FIG. 5C illustrate three typical neutral grounding scenarios, according to some example embodiments. FIG. 5A represents a solid neutral grounded scenario 500A. FIG. 5B represents a neutral ungrounded scenario 500B. FIG. 5C represents a resistance or reactance neutral grounded scenario 500C. According to some example embodiments, the neutral is treated as a node, and the neutral grounding rod is represented as an equivalent admittance connected between the neutral and the ground.

The solid grounded scenario 500A is modelled as a branch connected the neutral to the ground with a big admittance set as:

$$y^{Grd} = \frac{3I^{sc}}{|V_p|} \quad (10a)$$

$I^{SC}$ is the relay triggering setting for phase currents under triple phase to ground faults. $|V_p|$ is the rated phase voltage. $y^{Grd}$ is the equivalent grounding admittance.

The ungrounded scenario 500B is modelled as a branch connected the neutral to the ground with a small admittance set as:

$$y^{Grd} = \frac{\alpha^{ACC} I^{Rated}}{|V_p|} \quad (10b)$$

where $I^{Rated}$ is a rated normal phase current, $\alpha^{ACC}$ is the scaling factor defined by measurement unit accuracy class, $\alpha^{ACC} I^{Rated}$ defines the smallest current value that can be measured.

The resistance or reactance grounded scenario 500C is modelled as a branch connected the neutral to the ground with a given impedance set as:

$$y^{Grd} = \frac{1}{z^{Grd}} \quad (10c)$$

where $z^{Grd}$ is the grounding impedance.

Figure 6A:
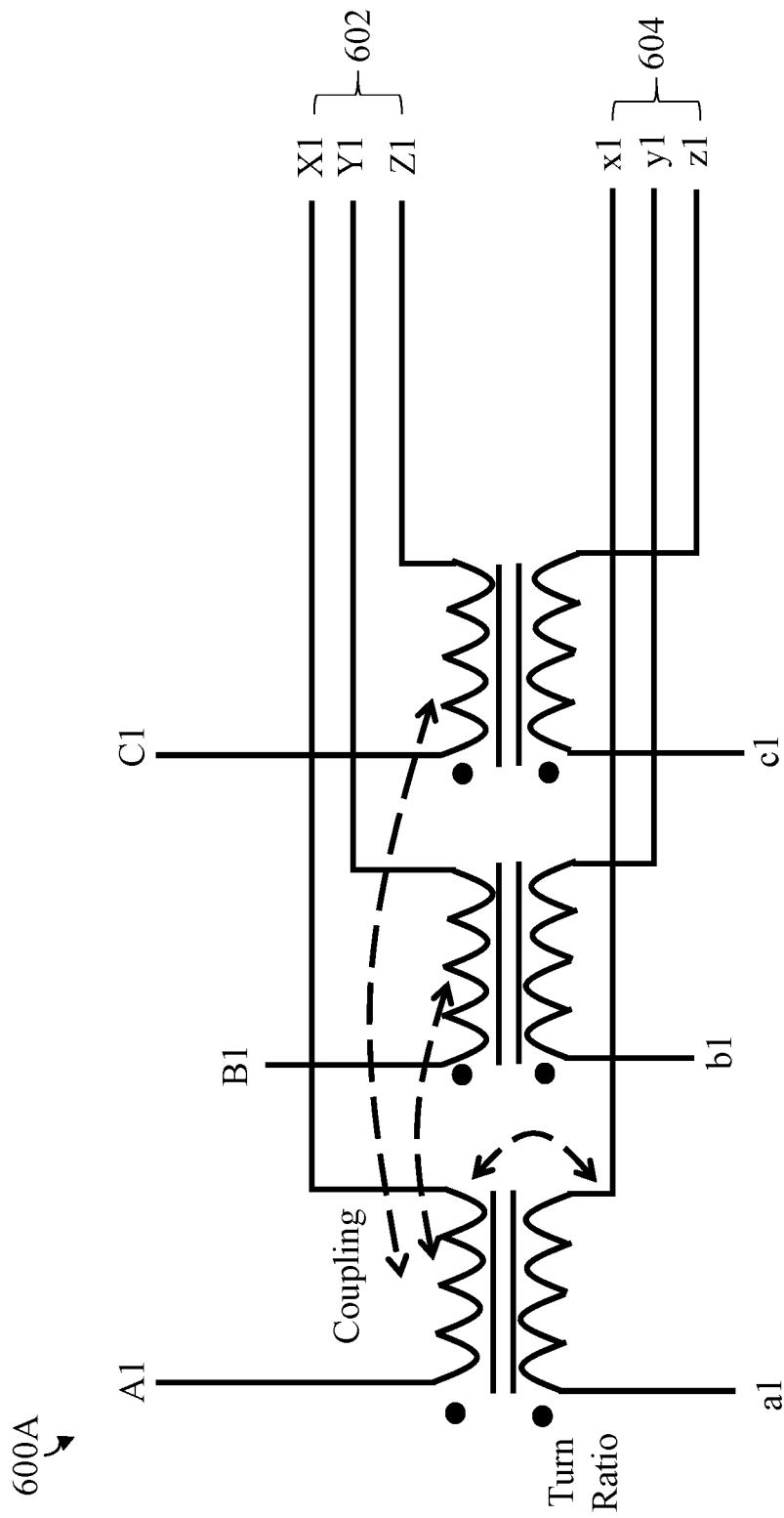
FIG. 6A and FIG. 6B illustrate the internal winding and outer terminal connections of a 3-phase transformer, according to some example embodiments.
Figure 6B:
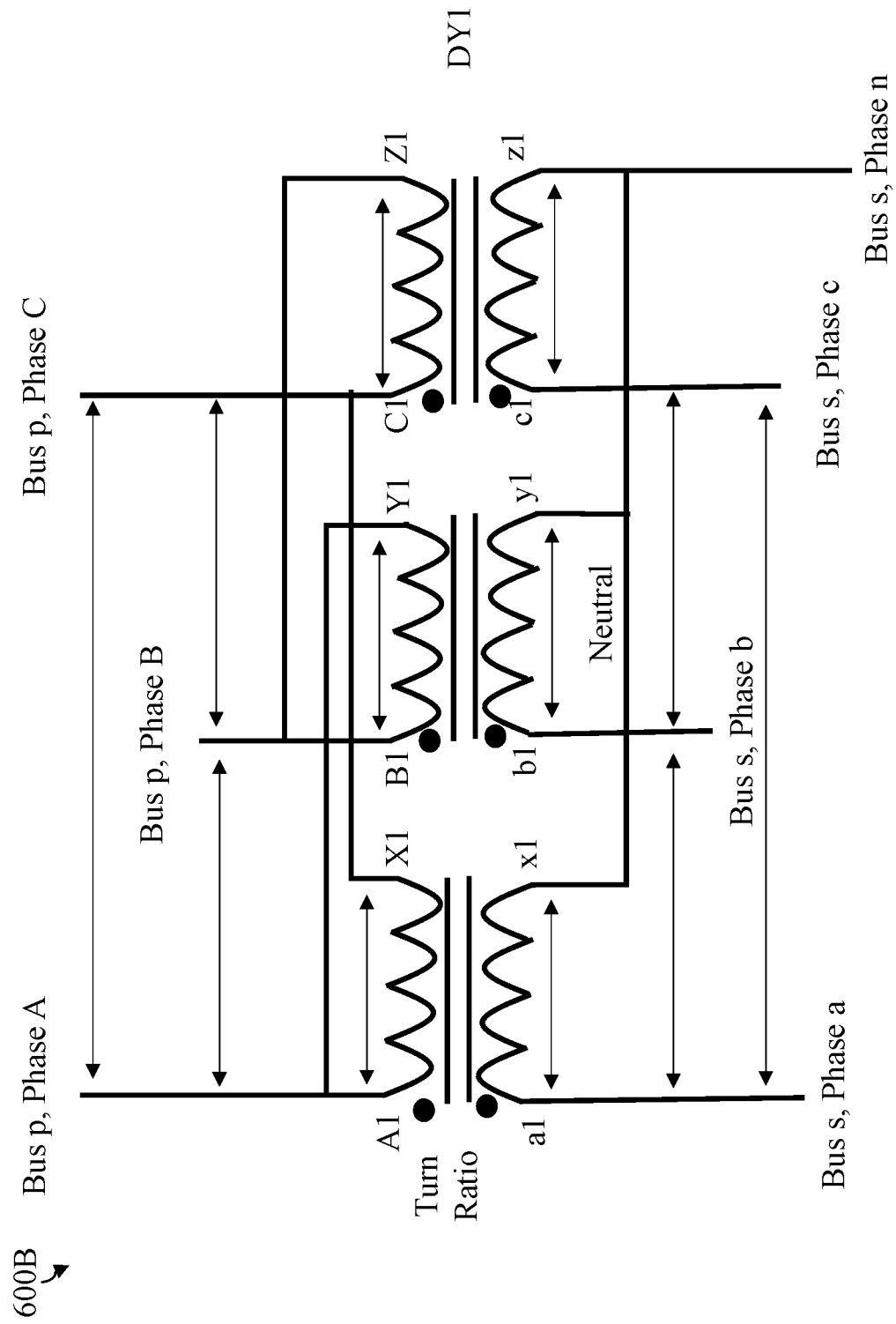

Modeling of Distribution Transformers, Voltage Regulators, Switches and Phase Jumpers FIG. 6A and FIG. 6B illustrate the internal winding and outer terminal connections of a 3-phase transformer, according to some example embodiments. As shown in FIG. 6A, the three-phase transformer 600A contains 6 coins and 12 nodes, including high-voltage nodes, A1, B1, C1 and low-voltage nodes X1, Y1, Z1 at the primary side 602, high voltage nodes a1,b1,c1 and low-voltage nodes x1,y1,z1 at the secondary side 604. The branch voltage deviation model for transformer internal windings can be given as:

$$\begin{bmatrix} V_p^{A1B1C1} - V_p^{X1Y1Z2} \\ V_s^{A1B1C1} - V_s^{X1Y1Z1} \end{bmatrix} = Z_{ps}^{Prim} \begin{bmatrix} I_p^{A1B1C1} \\ I_s^{A1B1C1} \end{bmatrix} \quad (11)$$

where $V_p^{A1B1C1}$ and $V_p^{X1Y1Z1}$, $V_x^{a1b1c1}$ and $V_x^{x1y1z1}$ are the 3×1 vectors of voltages of internal terminal nodes of primary and secondary windings, $I_p^{A1B1C1}$ and $I_x^{1a1b1c1}$ are the 3×1 vectors of injected currents of internal terminal nodes of primary and secondary windings, and $Z_{ps}^{Prim}$ is a 6×6 matrix representing the impedance relationship of the transformer 600A and defined as:

$$Z_{ps}^{Prim} = \begin{bmatrix} z_{ps}^{AA} & z_{ps}^{AB} & z_{ps}^{AC} & z_{ps}^{Aa} & z_{ps}^{Ab} & z_{ps}^{Ac} \\ z_{ps}^{BA} & z_{ps}^{BB} & z_{ps}^{BC} & z_{ps}^{Ba} & z_{ps}^{Bb} & z_{ps}^{Bc} \\ z_{ps}^{CA} & z_{ps}^{CB} & z_{ps}^{CC} & z_{ps}^{Ca} & z_{ps}^{Cb} & z_{ps}^{Cc} \\ z_{ps}^{aA} & z_{ps}^{aB} & z_{ps}^{aC} & z_{ps}^{aa} & z_{ps}^{ab} & z_{ps}^{ac} \\ z_{ps}^{bA} & z_{ps}^{bB} & z_{ps}^{bC} & z_{ps}^{ba} & z_{ps}^{bb} & z_{ps}^{bc} \\ z_{ps}^{cA} & z_{ps}^{cB} & z_{ps}^{cC} & z_{ps}^{ca} & z_{ps}^{cb} & z_{ps}^{cc} \end{bmatrix} \quad (12)$$

$Z_{ps}^{Prim}$ includes self-admittance on the primary winding (f.g. $z_{ps}^{AA}$), self-admittances on the secondary winding (f.g. $z_{ps}^{aa}$), mutual-admittances between the primary and the secondary windings at the same iron-core (such as $z_{ps}^{Aa}$), mutual-admittance between the primary windings (f.g. $z_{ps}^{AB}$), mutual-admittances between the primary and the secondary windings at the different iron-cores (f.g. $z_{ps}^{bA}$), mutual-admittances between the secondary windings (f.g. $z_{ps}^{ca}$). $Z_{ps}^{Prim}$ can be determined according to winding turn ratios, self and mutual resistances and reactances.

The branch current equation of the transformer 600A may then be given as:

$$\begin{bmatrix} I_p^{A1B1C1} \\ I_s^{a1b1c1} \\ I_p^{X1Y1Z1} \\ I_s^{x1y1z1} \end{bmatrix} = Y_{ps}^{Wnd} \begin{bmatrix} V_p^{A1B1C1} \\ V_s^{a1b1c1} \\ V_p^{X1Y1Z1} \\ V_s^{x1y1z1} \end{bmatrix} \quad (13)$$

where $I_p^{X1Y1Z1}$ and $I_p^{x1y1z1}$ are the injected currents at opposite-sides of primary and secondary terminals, and $I_p^{X1Y1Z1} = -I_p^{A1B1C1}$, $I_p^{x1y1z1} = -I_p^{a1b1c1}$, $Y_{ps}^{Wnd}$ is a 12×12 winding admittance matrix for the transformer 600A.

$$Y_{ps}^{Wnd} = \begin{bmatrix} Y_{ps}^{Prim} & -Y_{ps}^{Prim} \\ -Y_{ps}^{Prim} & Y_{ps}^{Prim} \end{bmatrix}, Y_{ps}^{Prim} = (Z_{ps}^{Prim})^{-1}.$$

Having obtained the outer terminal connections, the nodal admittance matrix for the transformer 600A may be obtained according to:

$$\begin{bmatrix} I_{ps} \\ I_{sp} \end{bmatrix} = Y_{ps}^{Zfmr} \begin{bmatrix} V_p \\ V_s \end{bmatrix} \quad (14)$$

$$Y_{ps}^{Xfmr} = (C_{ps}^{\Phi \to Wnd})^T Y_{ps}^{Wnd} C_{ps}^{\Phi \to Wnd} \quad (15)$$

$C_{ps}^{\Phi \to Wnd}$ is the voltage incidence matrix related internal winding terminal voltage with outer terminal voltages, and the incidence element is 1.0 if the interval winding terminal voltage is equal to the outer terminal voltage, otherwise the incidence element is 0.0.

For the transformer 600B illustrated in FIG. 6B, its connection type is DY1. For the primary winding, the internal terminal voltages $V_p^{A1B1C1}$ and $V_p^{X1Y1Z1}$ relate to outer terminal voltages $V_p^{ABCN}$:

$$V_s^{A1} = V_s^A, V_s^{B1} = V_s^B, V_s^{C1} = V_s^C \quad (16a)$$

$$V_s^{X1} = V_s^c, V_s^{Y1} = V_s^A, V_s^{Z1} = V_s^B \quad (16b)$$

For the secondary winding, the internal terminal voltages $V_s^{a1b1c1}$ and $V_s^{x1y1z1}$ relate to outer terminal voltages $V_p^{abc}$:

$$V_p^{a1} = V_p^a, V_p^{b1} = V_p^b, V_p^{c1} = V_p^c \quad (17a)$$

$$V_p^{x1} = V_p^n, V_p^{y1} = V_p^n, V_p^{z1} = V_p^n \quad (17b)$$

Then the voltage incidence matrix $C_{ps}^{\Phi \to Wnd}$ is a 12×7 matrix, and defined as:

$$C_{ps}^{\Phi \to Wnd} = \begin{matrix} & \begin{matrix} A & B & C & a & b & c & n \end{matrix} \\ \begin{matrix} A1 \\ B1 \\ C1 \\ a1 \\ b1 \\ c1 \\ X1 \\ Y1 \\ Z1 \\ x1 \\ y1 \\ z1 \end{matrix} & \begin{bmatrix} 1 & & & & & & \\ & 1 & & & & & \\ & & 1 & & & & \\ & & & 1 & & & \\ & & & & 1 & & \\ & & & & & 1 & \\ & & & & & & 1 \\ 1 & & & & & & \\ & 1 & & & & & \\ & & & 1 & & & \\ & & & & 1 & & \\ & & & & & 1 & \end{bmatrix} \end{matrix} \quad (18)$$

The nodal admittance model for the transformer, $Y_{ps}^{Xfmr}$ can be decoupled into self and mutual sub-admittances according to the phases of sending and receiving buses as:

$$Y_{ps}^{Xfmr} = \begin{bmatrix} Y_{pp} & Y_{ps} \\ Y_{sp} & Y_{ss} \end{bmatrix} \quad (19)$$

Then the relationship between nodal phase to ground voltages and branch phase currents can be represented using equation (4c).

Furthermore, if $Y_{ps}$ and $Y_{sp}$ are square matrices i.e. $Y_{ps}^{Xfmr}$ is symmetrical, the inversions of $Y_{ps}$ and $Y_{sp}$ may be obtained using singular value decomposition, then using equations (5) and (6) either side of voltages and currents may be obtained if other side ones are given. If $Y_{ps}$ and $Y_{sp}$ are unsymmetrical not square matrices, i.e., not invertible, the corresponding matrix inversions may be replaced with inversions of symmetrical square matrices $Y_{sp}Y_{ps}$ and $Y_{ps}Y_{sp}$.

When $V_p$, $I_{ps}$ are given, $V_s$, $I_{sp}$ can be determined as follows: i). first multiply both left and right sides of (4a) with $Y_{sp}$, and obtain $V_s = (Y_{sp}Y_{ps})^{-1}Y_{sp}I_{ps} - (Y_{sp}Y_{ps})^{-1}Y_{sp}Y_{pp}V_p$; ii). after that, this is plugged into (4b), to obtain $I_{sp} = (Y_{sp} - Y_{ss}(Y_{sp}Y_{ps})^{-1}Y_{sp}Y_{pp})V_p + Y_{ss}(Y_{sp}Y_{ps})^{-1}Y_{sp}I_{ps}$. In compact form, $V_s$, $I_{sp}$ can be determined according to:

$$\begin{bmatrix} V_s \\ I_{sp} \end{bmatrix} = \begin{bmatrix} -(Y_{sp}Y_{ps})^{-1}Y_{sp}Y_{pp} & (Y_{sp}Y_{ps})^{-1}Y_{sp} \\ Y_{sp} - Y_{ss}(Y_{sp}Y_{ps})^{-1}Y_{sp}Y_{pp} & Y_{ss}(Y_{sp}Y_{ps})^{-1}Y_{sp} \end{bmatrix} \begin{bmatrix} V_p \\ I_{ps} \end{bmatrix} \quad (20)$$

Similarly, $V_p$, $I_{ps}$ can be determined with known $V_s$, $I_{sp}$ by first multiplying $Y_{ps}$ to both sides of (4b), to obtain $V_p = (Y_{ps}Y_{sp})^{-1}Y_{ps}I_{sp} - (Y_{ps}Y_{sp})^{-1}Y_{ps}Y_{ss}V_s$. Then plugging it into (4a), gives $I_{ps} = Y_{pp}(Y_{ps}Y_{sp})^{-1}Y_{ps}I_{sp} + (Y_{ps} - Y_{pp}(Y_{ps}Y_{sp})^{-1}Y_{ps}Y_{ss})V_s$. In compact form, $V_p$, $I_{ps}$ can be determined as:

$$\begin{bmatrix} V_s \\ I_{ps} \end{bmatrix} = \begin{bmatrix} -(Y_{ps}Y_{sp})^{-1}Y_{ps}Y_{ss} & (Y_{ps}Y_{sp})^{-1}Y_{ps} \\ Y_{ps} - Y_{ss}(Y_{ps}Y_{sp})^{-1}Y_{ps}Y_{ss} & Y_{ss}(Y_{ps}Y_{ss})^{-1}Y_{ps} \end{bmatrix} \begin{bmatrix} V_s \\ I_{sp} \end{bmatrix} \quad (21)$$

Equations (20) and (21) define current and voltage allocation matrices using converted branch admittance matrices when mutual admittance matrices are squared matrices.

Besides transformers, step voltage regulators are well known as one of the voltage control equipment used in current/power distribution systems. The step-voltage regulator is basically a transformer that has its high-voltage winding (shunt) and low-voltage winding (series) connected to either aid or oppose their respective voltages. Subsequently, the output voltage could be the sum or difference between the winding voltages.

Step voltage regulators are of zero-impedance branches. In addition, a switch or a phase jumper can be treated as zero-impedance branches to be modeled as well.

For a zero-impedance branch bus p and bus s, its injected phase currents at two terminal buses are related to each other as:

$$I_{ps} = C_{sp \to ps}^I I_{sp} \quad (22a)$$

$$I_{sp} = C_{ps \to sp}^I I_{ps} \quad (22b)$$

$C_{sp \to ps}^I$ and $C_{ps \to sp}^I$ are the current conversion matrices to convert phase currents injected from bus s into ones injected from bus p, and phase currents injected from bus p into ones injected from bus s, respectively. The phase to ground voltages at two terminal buses are related to each other as:

$$V_p = C_{s \to p}^V V_s \quad (23c)$$

$$V_s = C_{p \to s}^V V_p \quad (23d)$$

$C_{s \to p}^V$ and $C_{p \to s}^V$ are the voltage conversion matrices to convert voltages at bus s into ones at bus p, and voltages at bus p into ones at bus s, respectively.

Modeling of Distributed Generators, Loads and Capacitors

Distributed generators can be a conventional synchronous generator, an equivalent synchronous generator (such as a substation connected with main grid), or a power electronics-based generator, such as a grid forming inverter, or a grid following inverter. Distributed generators may be either connected between the phase wires and the neutral wire using Wye connection, or connected between phase wires using Delta connection.

The distributed generators may be regulated using the active power-frequency (P-f) and reactive power-voltage (Q-V) droop controllers to share the needs for power supply. The P-f and Q-V droop control can be determined as:

$$\omega_i = \omega_i^{Rtd} - m_i P_i \quad (24a)$$

$$V_i = V_i^{Rtd} - n_i Q_i \quad (24b)$$

where i is index representing each generator or inverter, $\omega_i^{Rtd}$ and $V_i^{Rtd}$ are rated angular frequency and voltage amplitude of generator or inverter i, respectively. $P_i$ and $Q_i$ are measured average active and reactive power values, respectively. $m_i$ and $n_i$ are active and reactive droop coefficients, respectively.

For a generator connected between phase pair $\varphi\varphi'$ at bus i, its complex generation output $SG_i^{\varphi\varphi'}$ can be described as:

$$SG_i^{\varphi\varphi'} = PG_i^{\varphi\varphi'} + jQG_i^{\varphi\varphi'} = \quad (25)$$
$$\left(PG_i^{SCH,\varphi\varphi'} + PG_i^{RES,\varphi\varphi'}\right) + j\left(QG_i^{SCH,\varphi\varphi'} + QG_i^{RES,\varphi\varphi'}\right)$$
$$\varphi\varphi' \in \Phi^{PAIR}, \Phi^{PAIR} = \{an, bn, cn, ab, bc, ca\}$$

where $PG_i^{\varphi\varphi'}$ and $QG_i^{\varphi\varphi'}$ are the generated active power and reactive power. The generated active power can be broken into two parts, the first part, $PG_i^{SCH,\varphi\varphi'}$ is the scheduled active power generation to satisfy load demands of the system that determined by economical dispatch, and the second part, $PG_i^{RES,\varphi\varphi'}$ is the residual active power generation that used to mitigate system active power imbalance caused power loss or prediction error. Similarly, the generated reactive power, $QG_i^{\varphi\varphi'}$ can also be broken into two parts, one is scheduled reactive power generation, $QG_i^{SCH,\varphi\varphi'}$ to support reactive load demands, and the other is the residual reactive power generation, $QG_i^{RES,\varphi\varphi'}$ to mitigate system reactive power imbalance caused reactive power loss or prediction error and local bus voltage deviation from scheduled voltage level.

The residual active power generation for generator at bus i between phases $\varphi\varphi'$, $PG_i^{RES,\varphi\varphi'}$ can be determined based on a global participation factor $\alpha_i^{P,\varphi\varphi'}$ and the system total active power imbalance, $P^{IBL}$.

$$PG_i^{RES,\varphi\varphi'} = \alpha_i^{P,\varphi\varphi'} P^{IBL} \quad (26a)$$

The participation factor can be determined based on active power droop coefficients for all participated generators for power imbalance mitigation according to:

$$\alpha_i^{P,\varphi\varphi'} = \frac{1/m_i^{\varphi\varphi'}}{\sum_{i \in NG^{RES}} \sum_{\varphi\varphi'} 1/m_i^{\varphi\varphi'}} \quad (26b)$$

$$\sum_{i \in NG^{RES}} \sum_{\varphi\varphi'} \alpha_i^{P,\varphi\varphi'} = 1 \quad (26c)$$

$$0 \le \alpha_i^{P,\varphi\varphi'} \le 1 \quad (26d)$$

where $NG^{RES}$ is the set of buses that connected with generators that participated in power imbalance mitigation. The residual active power generations will increase or decrease for all participating generators simultaneously.

The residual reactive power generation for generator at bus i between phases $\varphi\varphi'$, $QG_i^{RES,\varphi\varphi'}$ can be determined based on a local reactive participation factor $\beta_i^{Q,\varphi\varphi'}$, and a global reactive participating factor, the local voltage mismatch between actual value, $|V_i^{\varphi\varphi'}|$ and scheduled value, $|V_i^{SCH,\varphi\varphi'}|$, and the system total reactive power imbalance $Q^{IBL}$:

$$QG_i^{RES,\varphi\varphi'} = \beta_i^{Q,\varphi\varphi'}\left(|V_i^{\varphi\varphi'}| - |V_i^{SCH,\varphi\varphi'}|\right) + \gamma_i^{Q,\varphi\varphi'} Q^{IBL} \quad (27a)$$

The global reactive participation factors may be determined based on reactive power droop coefficients for the participated generator.

$$\gamma_i^{Q,\varphi\varphi'} = \frac{1/n_i^{\varphi\varphi'}}{\sum_{i \in NG^{RES}} \sum_{\varphi\varphi'} 1/n_i^{\varphi\varphi'}} \quad (27b)$$

$$\sum_{i \in NG^{RES}} \sum_{\varphi\varphi'} \gamma_i^{Q,\varphi\varphi'} = 1 \quad (27c)$$

$$0 \le \gamma_i^{Q,\varphi\varphi'} \le 1 \quad (27d)$$

The local reactive participation factors may also be determined based on reactive power droop coefficients for the participated generator according to (27e) and (27f), or other mechanisms such as the sensitivity of reactive power injection with bus voltages for the bus under study:

$$\beta_i^{Q,\varphi\varphi'} = -1/n_i^{\varphi\varphi'} \quad (27e)$$

$$\beta_i^{Q,\varphi\varphi'} \ge 0 \quad (27f)$$

The local residual reactive power generation component for each participating generator will increase or decrease independently based on its own local voltage conditions. However, the global residual reactive power generation component for all participating generators will increase or decrease simultaneously.

Loads can be connected between the phase wires and the neutral wire using Wye connection. It can also be connected between phase wires using Delta connection. The load can be a constant power load, a constant current load, and a constant impedance load. For any phase pair $\varphi\varphi'$ at bus i, the complex power consumption, $SD_i^{\varphi\varphi'}$ can be represented as:

$$SD_i^{\varphi\varphi'} = PD_i^{\varphi\varphi'} + jQD_i^{\varphi\varphi'} = \quad (28)$$
$$SD_i^{CP,\varphi\varphi'} + \frac{|V_i^{\varphi\varphi'}|}{|V_i^{Rtd,\varphi\varphi'}|} SD_i^{CI,\varphi\varphi'} + \left(\frac{|V_i^{\varphi\varphi'}|}{|V_i^{Rtd,\varphi\varphi'}|}\right)^2 SD_i^{CZ,\varphi\varphi'}$$
$$\varphi\varphi' \in \Phi^{PAIR}$$

$PD_i^{\varphi\varphi'}$ and $QD_i^{\varphi\varphi'}$ are the active power and reactive power components of $SD_i^{\varphi\varphi'}$. $SD_i^{CP,\varphi\varphi'}$, $SD_i^{CI,\varphi\varphi'}$ and $SD_i^{CZ,\varphi\varphi'}$ are the rated complex powers for constant power component, constant current component, and constant impedance component of load for phase pair $\varphi\varphi'$ at bus i. $V_i^{\varphi\varphi'}$ and $V_i^{Rtd,\varphi\varphi'}$ are the actual and rated voltages between phase pair $\varphi\varphi'$ at bus i. The constant impedance components can be treated as a constant impedance connected between phases to be considered.

Similarly, capacitors can be connected using Wye or Delta configurations. The reactive power output for any phase pair $\varphi\varphi'$ of bus i, $QC_i^{\varphi\varphi'}$ can be represented as:

$$QC_i^{\varphi\varphi'} = \left(\frac{|V_i^{\varphi\varphi'}|}{|V_i^{Rtd,\varphi\varphi'}|}\right)^2 QC_i^{Rtd,\varphi\varphi'} \quad (29)$$
$$\varphi\varphi' \in \Phi^{PAIR}$$

$QC_i^{Rtd,\varphi\varphi'}$ is the rated reactive power for the capacitor connected between phase pair $\varphi\varphi'$ at bus i. The capacitors can be treated as a constant impedance/admittance connected between phases (including neutrals). Depending on the available phases, the generators, loads and capacitors can be of single-phase, two-phase or three-phase, and connected between phases, or phases and neutral.

Unbalanced Load Flow of Power Distribution Systems

The power distribution system may adopt a radial configuration, but flows may be bidirectional due to distributed generations, and multiple generators participating in active and reactive power balancing. Due to connection complexity of large-scale distribution systems, conventional load flow methods such as Gauss-Seidel, Newton, and Backward/forward sweep methods have faced challenges for obtaining accurate solution efficiently and cannot meet the requirements for real-time applications. Some example embodiments provide a hybrid system and component-based algorithm, in which based on scheduled generations, loads and controller settings, an initial load flow is solved using system-based model, and upon receiving the dispatched generations, loads and controller setting update the load flow is updated using component-based model.

Zero-impedance Branch Connected with Non-zero Impedance Branch with Unmatched Phase Connections The system-based algorithm models are based on nodal admittance matrix of the system generated by using each component/branch admittance matrix in which each branch's energized phases (including neutral) are modeled as nodes. However, some types of branches, such as phase jumpers, step voltage regulators, and switches do not have their nodal admittance matrices due to ignorable branch impedance. Such branches may be referred to as zero-impedance branches. A phase or wiring Jumper is a short length conductor that is used to connect two points in an electrical circuit especially used for phase connection changes of single-phase loads. The switches used in distribution systems may include circuit breakers, and sectionalization switch or tie switches.

In order to formulate nodal admittance for a zero-impedance branch, it is merged with an adjacent non-zero impedance branch to be considered. Considering the possibility of bidirectional flows, the adjacent branch is chosen as one of non-zero impedance branches having common terminal with the zero-impedance branch and phases presenting at the common terminal viewing from the non-zero branch include all phases presenting at the common terminal viewing from the zero-impedance branch.

Figure 7:
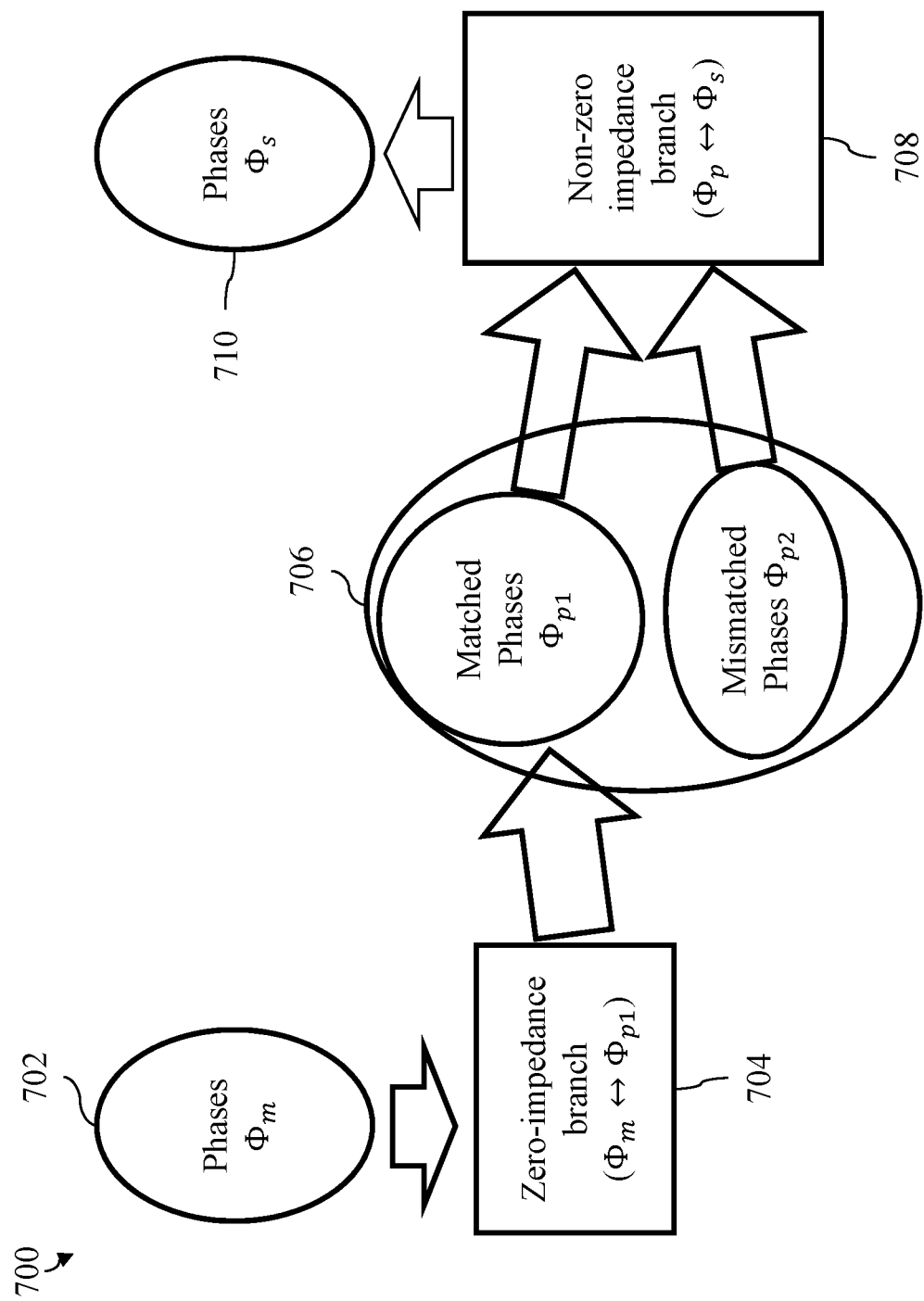
FIG. 7 illustrates an exemplar configuration having a zero-impedance branch between a first bus and a second bus connected with a non-zero impedance branch between the second bus and a third bus, according to some example embodiments.

FIG. 7 illustrates an exemplar configuration 700 having a zero-impedance branch 704 between bus m and bus p connected with a non-zero impedance branch 708 between bus p and bus s. The phase set 706 of bus p, $\Phi_p$ can be broken into two sub-sets, matched phases $\varphi_{p_1}$ and mismatched phases $\varphi_{p_2}$. The zero-impedance branch 704 connects phases 702 at bus m, $\varphi_m$ with some phases present at bus p, $\varphi_{p_1}$. The impedance branch connects phases 710 at bus s, $\varphi_s$ with all phases at bus p, $\varphi_p$. $\varphi_p = \varphi_{p_1} \cup \varphi_{p_2}$. $\varphi_{p_1}$ and $\varphi_{p_2}$ represent the phase set matched between zero-impedance branch and non-zero impedance branch, and the phase set unmatched between zero-impedance branch and non-zero impedance branch, respectively.

Splitting phase set $\varphi_p$ into $\varphi_{p_1}$ and $\varphi_{p_2}$, the phase currents of non-zero impedance branch bus p and bus s can be described as:

$$\begin{bmatrix} I_{p_1 s} \\ I_{p_2 s} \\ I_{sp} \end{bmatrix} = \begin{bmatrix} Y_{p_1 p_1} & Y_{p_1 p_2} & Y_{p_1 s} \\ Y_{p_2 p_1} & Y_{p_2 p_2} & Y_{p_2 s} \\ Y_{sp_1} & Y_{sp_2} & Y_{ss} \end{bmatrix} \begin{bmatrix} V_{p_1} \\ V_{p_2} \\ V_s \end{bmatrix} \quad (30)$$

The currents at non-zero impedance branch $I_{p_1 s}$ is related to ones at zero impedance branch $I_{p_1 m}$ as:

$$I_{p_1 m} = -I_{p_1 s} \quad (31)$$

For the zero-impedance branch bus m and bus p, its injected phase currents and voltages at bus p, $I_{p_1 m}$ and $V_{p_1}$ are related to its count parts at bus m, $I_{mp_1}$ and $V_m$ as:

$$I_{mp_1} = C^I_{p_1 m \to mp} I_{p_1 m} \quad (32a)$$

$$V_{p_1} = C^V_{m \to p_1} V_m \quad (32b)$$

The following equation may be obtained to describe phase currents and nodal voltages of combined three bus model for merging the non-zero impedance branch between bus p and bus s with zero impedance branch bus m and bus p:

$$\begin{bmatrix} I_{mp_1} \\ I_{p_2 s} \\ I_{sp} \end{bmatrix} = \begin{bmatrix} -C^I_{p_1 m \to mp} Y_{p_1 p_1} C^V_{m \to p_1} & -C^I_{p_1 m \to mp} Y_{p_1 p_2} & -C^I_{p_1 m \to mp} Y_{p_1 s} \\ Y_{p_2 p_1} C^V_{m \to p_1} & Y_{p_2 p_2} & Y_{p_2 s} \\ Y_{sp_1} C^V_{m \to p_1} & Y_{sp_2} & Y_{ss} \end{bmatrix} \begin{bmatrix} V_m \\ V_{p_2} \\ V_s \end{bmatrix} \quad (33)$$

This 3-bus model includes full phase set of bus m, unmatched phase set of bus p, and full phase set of bus s.

Extend the above strategy to one zero-impedance branch connecting with multiple impedance branches from same bus, a compact multi-bus based nodal admittance model can be used to represent relationships between nodal injected currents and nodal voltages at a plurality of non-overlapped phases of buses for the section formed by zero impedance branch connected with impedance branches.

Distributed Slack Buses

For a traditional load flow analysis, one bus is selected to absorb all system loss and mismatches. This slack bus serves as the reference for the voltage angles of all busses, and the power-balancing bus that makes up for the difference between the scheduled generation and the combined loads and losses. Hence, the slack bus is considered a voltage source with a large power capacity, i.e., an "infinite power source". However, for a practical distribution system, particularly one with high penetration of distributed generations, it is difficult to find a bus that can be assigned all the slack of system, and the slack shall be distributed among a set of participating distributed generators.

Some example embodiments have divided the buses/nodes for the system into 5 different types, including reference (V$\theta$) bus/nodes, fV buses/nodes, fQ buses/nodes, PV buses/nodes and PQ buses/nodes.

The reference (V$\theta$) bus/nodes is/are the bus/nodes with corresponding voltage magnitude and phase angle are known, meanwhile their active power injections and reactive power injections are adjustable. It is chosen from buses with generators with higher capacity, such as equivalent synchronous generation buses for substations.

The fV buses/nodes are the buses/nodes with voltage magnitude and frequency given, meanwhile corresponding phase angles, active power injections and reactive power injections are adjustable. This type of buses/nodes include grid forming inverter-based generators with constant frequency control and constant voltage control, and synchronous generators with constant frequency control and constant voltage control.

The fQ buses/nodes are the buses/nodes with corresponding reactive power injection and frequency known, meanwhile corresponding phase angles and active power injections are adjustable. This type of buses/nodes include grid forming inverter based generators with constant frequency control, and synchronous generators with constant frequency control.

The PV buses/nodes are the buses/nodes with corresponding active power injections and voltage magnitudes are known, meanwhile corresponding phase angles, reactive power injections are adjustable. This type of buses/nodes include grid forming inverters with constant voltage control, and synchronous generators with constant voltage control such as static synchronous compensators (STATCOMs).

The PQ buses/nodes are the buses/nodes with corresponding active power injections and reactive injections are known, meanwhile corresponding phase angles and voltage magnitudes are adjustable. This type of buses/nodes include grid following inverters with constant PQ control, loads, and synchronous generators with constant PQ control.

The distributed slack bus model is implemented by the set of buses including reference buses, fV buses, fQ buses and PV buses in which system active and reactive power mismatches are mitigated by sharing the active and reactive power mismatches between participating generators, and solving additional local reactive needs through voltage regulation of participating generators. The frequency of the power distribution system is maintained through active power adjustments of reference, fV, and fQ buses. The voltages of the power distribution systems are maintained through reactive power adjustments of reference, fV, and PV buses.

Component Based Analysis Method for Load Flow with Distributed Slack Buses

The conventional backward/forward sweep algorithm is designed to solve the load flows of radial distribution systems with a single slack bus and all others PQ buses. It cannot solve the systems with multiple slack buses. Some example embodiments extend the backward/forward sweep algorithm with residual active and reactive power updating to enable solving load flows for distribution systems with distributed slack buses.

Figure 8:
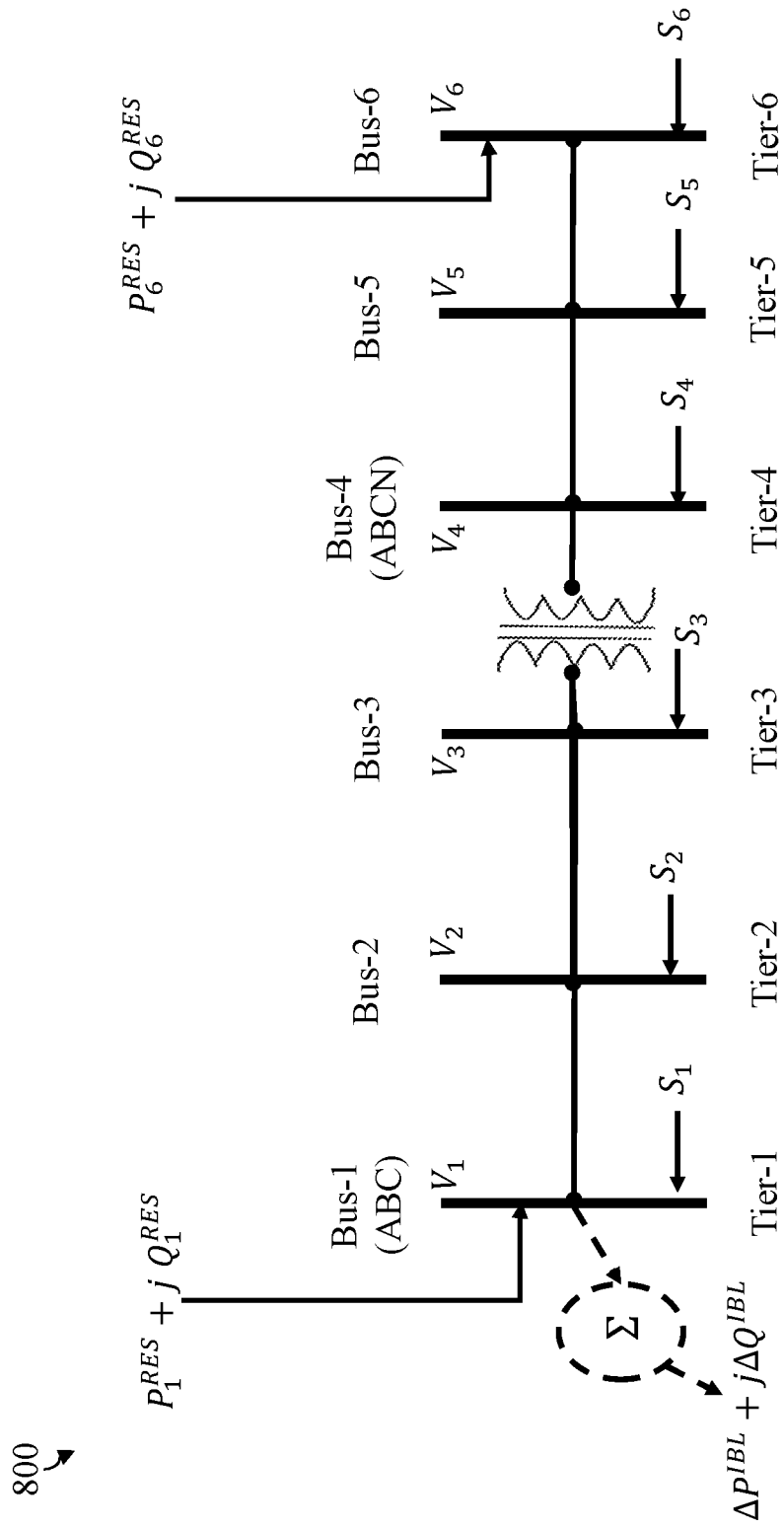
FIG. 8 illustrates a one-line diagram used to represent the graphic connections of a radial distribution system, according to some example embodiments.

FIG. 8 illustrates a one-line diagram used to represent the graphic connections 800 of a radial distribution system illustrated by FIG. 1B. Bus 1 may be selected as a reference bus. Bus 6 may be selected as a fV bus. Both Bus 1 and Bus 6 are served as distributed slack buses.

The purpose of load flow computation is to determine the magnitudes and phase angles for each energized phase at every bus, and the residual active power and reactive power generated by distributed slack buses.

The radial distribution system can be represented as a graph in which the buses are modelled as nodes of the graph, and the branches as links of the graph. Taken one of reference buses as the root. The connectivity relationships between nodes can be obtained by executing an all-connected tracing. Based on tracing results, the nodes can be divided into several layers based on the number of branches connected to the root. The root belongs to the first layer and the higher the number of layers, the farther the node from the root.

Assuming the total number of layers is D, the load-flow computation can be achieved through an iterative procedure in which, at each iteration two computational stages are performed: the first stage is called backward sweep for calculating the powers/currents flowing through the branches and the injected powers/currents to the nodes starting from ones connected to the last layer D and proceeding in the backward direction towards the first layer. Besides scheduled powers from generations, loads or compensations, the injected powers for distributed slack bus include allocation of global residual active and reactive power generations for all distributed slack buses and local residual reactive powers for voltage deviation corrections based on latest global residual powers and bus voltages. The global residual active and reactive power generations are updated after current/power summation on the first layer. The other stage is called forward sweep for calculating the voltage magnitude and phase angle of each node starting from the root node and proceeding in the forward direction towards the nodes at last layer.

Before performing backward/forward sweep, the iteration value is set as k=0, phase to ground voltages for each phase $\varphi \in \Phi_s$ of us, $s \in N$, and system active and reactive power imbalances are set as $P^{IBL(k)}=0$, and $Q^{IBL(k)}=0$. The phase to ground voltages are set based on corresponding voltages at the reference bus. Then the initial voltages for each phase pair of each bus are determined according to:

$$V_s^{\varphi\varphi'(k)} = V_s^{\varphi(k)} - V_s^{\varphi'(k)}, \varphi \in \Phi_s, \varphi\varphi' \in \Phi_s^{PAIR}, s \in N \qquad (34)$$

where $\Phi_s$ is the phase set of bus s, and $\Phi_s^{PAIR}$ is the phase pairs existing in bus s. N is the set of buses in the system.

The backward sweep is a nodal current or power summation process with residual active and reactive power update. The process iterates nodes from ones connected to the last layer D towards ones of the first layer. During the backward propagation, the voltages and residual active and reactive power are assumed kept constant as values at last iteration.

Assuming bus s is a node located at layer d, $\Phi_s$ is the set of phases at the bus, the backward sweep includes the steps described next. The first step is to calculate the equivalent injection currents at bus s based on equivalent injected powers from generation output, load demands and reactive compensations calculated using voltages and residual active and reactive powers at last iteration according to:

$$I_s^{\varphi(k)} = \text{conjugate}\left(\frac{S_s^{\varphi(k)}}{V_s^{\varphi(k-1)}}\right), \varphi \in \Phi_s \qquad (35)$$

where $I_s^{\varphi(k)}$ is the injection current at bus s phase $\varphi$ on iteration k. $S_s^{\varphi(k)}$ is the equivalent power injection at phase $\varphi$ of bus s at iteration k. $V_s^{\varphi(k-1)}$ is the phase to ground voltage of bus s phase q at iteration (k−1). $S_s^{\varphi(k)}$ is converted from power injections between phase pairs, $\varphi'\varphi''$ at bus s as:

$$S_s^{\varphi(k)} = \sum\nolimits_{\varphi'\varphi''\in\Phi^{PAIR}} C_{\varphi'\varphi''\to\varphi}^I(\varphi)\left(SG_s^{\varphi'\varphi''(k)} - SD_s^{\varphi'\varphi''(k)} + jQC_s^{\varphi'\varphi''(k)}\right) \quad (36)$$

$C_{\varphi'\varphi''\to\varphi}^I$ is a contribution coefficient matrix to calculate equivalent currents at phases, $\varphi$ based on the currents at phase pairs, $\varphi'\varphi''$ and defined as:

$$C_{\varphi'\varphi''\to\varphi}^I = \begin{matrix} & an & bn & cn & ab & bc & ca \\ a & 1 & & & 1 & & -1 \\ b & & 1 & & -1 & 1 & \\ c & & & 1 & & -1 & 1 \\ n & -1 & -1 & -1 & & & \end{matrix} \quad (37)$$

$C_{\varphi'\varphi''\to\varphi}^I(\varphi)$ is the vector of contribution factors corresponding to the row related to phase $\varphi$.

The generator power output on phase pairs, $\varphi'\varphi''$ at bus s on iteration k, $SG_s^{\varphi'\varphi''(k)}$ is calculated as:

$$SG_s^{\varphi'\varphi''(k)} = \left(PG_s^{SCH,\varphi'\varphi''} + \alpha_s^{P,\varphi'\varphi''} P^{IBL(k-1)}\right) + \quad (38)$$
$$j\left(QG_s^{SCH,\varphi'\varphi''} + \gamma_s^{Q,\varphi'\varphi''} Q^{IBL(k-1)} + \beta_s^{Q,\varphi'\varphi''}\left(\left|V_s^{\varphi'\varphi''(k-1)}\right| - \left|V_s^{SCH,\varphi'\varphi''}\right|\right)\right)$$

The load power consumption on phase pairs, $\varphi'\varphi''$ at bus s on iteration k, $SD_s^{\varphi'\varphi''(k)}$ is calculated as:

$$SD_s^{\varphi'\varphi''(k)} = \quad (39)$$
$$SD_s^{CP,\varphi'\varphi''} + \frac{\left|V_s^{\varphi'\varphi''(k-1)}\right|}{\left|V^{Rtd,\varphi'\varphi''}\right|} SD_s^{CI,\varphi'\varphi''} + \left(\frac{\left|V_s^{\varphi'\varphi''(k-1)}\right|}{\left|V^{Rtd,\varphi'\varphi''}\right|}\right)^2 SD_s^{CZ,\varphi'\varphi''}$$

The capacitor reactive power output on phase pairs, $\varphi'\varphi''$ at bus s on iteration k, $QC_s^{\varphi'\varphi''(k)}$ is calculated as:

$$QC_s^{\varphi'\varphi''(k)} = \left(\frac{\left|V_s^{\varphi'\varphi''(k-1)}\right|}{\left|V^{Rtd,\varphi'\varphi''}\right|}\right)^2 QC_s^{Rtd,\varphi'\varphi''} \quad (40)$$

The second step for backward sweep is to calculate branch injection currents from node s at layer d to node p at layer (d+1) according to:

$$I_{sp}^{\varphi(k)} = I_s^{\varphi(k)} - \sum\nolimits_{t\in DN_s} I_{st}^{\varphi(k)} \quad (41)$$

$DN_s$ is the set of downstream buses at layer (d−1) connected to bus s at layer d. $I_{st}^{\varphi(k)}$ is the current of the branch connecting node s at layer d to its downstream node t at layer (d−1). $I_{sp}^{\varphi(k)}$ is the current of the branch connecting node s to its upstream stream node p at layer (d+1).

If layer d is the first layer and bus p does not exist, the backward sweep for iteration k is completed, and go to forward sweep stage. $I_{sp}^{\varphi(k)}$ computation (41) is replaced as residual active power update, $P^{IBL(k)}$:

$$P^{IBL(k)} + jQ^{IBL(k)} = P^{IBL(k-1)} + jQ^{IBP(k-1)} - \sum\nolimits_{\varphi} V_s^{\varphi(k-1)} \text{conjugate}\left(I_{sp}^{\varphi(k)}\right) \quad (42)$$

The third step is to calculate the current of the branch connecting upstream node p at layer (d+1) to node s at layer d, $I_{ps}^{(k)}$ according to branch type. For a non-zero impedance branch, if its mutual admittances are of square matrices, then the following equation can be used to compute $I_{ps}^{(k)}$.

$$I_{ps}^{(k)} = \left(Y_{ps} - Y_{pp}Y_{sp}^{-1}Y_{ss}\right)V_s^{(k-1)} + Y_{pp}Y_{sp}^{-1}I_{sp}^{(k)} \quad (43)$$

If its mutual admittances are not of square matrices, then the following equation can be used to compute $I_{ps}^{(k)}$.

$$I_{ps}^{(k)} = Y_{ps} - Y_{ss}(Y_{ps}Y_{sp})^{-1}Y_{ps}Y_{ss}V_s^{(k-1)} + Y_{ss}(Y_{ps}Y_{ss})^{-1}Y_{ps}I_{sp}^{(k)} \quad (44)$$

For a zero-impedance branch, $I_{ps}^{(k)}$ can be computed as:

$$I_{ps}^{(k)} = C_{sp\to ps}^I I_{sk}^{(k)} \quad (45)$$

The forward sweep is a voltage drop calculation process with residual reactive power updates. The voltage calculations are iterated from nodes connected to the first layer towards ones at last layer D. During the forward propagation the phase currents of each branch is held constant to the value obtained in backward sweep.

For a non-zero impedance branch, if its mutual admittances are of square matrices, then the following equation can be used to compute $V_s^{(k)}$:

$$V_s^{(k)} = -Y_{ps}^{-1}Y_{pp}V_p^{(k)} + Y_{ps}^{-1}I_{ps}^{(k)} \quad (46)$$

$V_s^{(k)}$ is the vector of phase to ground voltages of bus s at iteration k. $V_p^{(k)}$ is the vector of phase to ground voltage of the immediate upstream bus p of bus s, $I_{ps}^{(k)}$ is the vector of branch currents from bus p to bus s, and $Y_{pp}$ and $Y_{ps}$ are the self and mutual admittances of branch connecting bus p to bus s.

If its mutual admittances are not of square matrices, then the following equation can be used to compute $V_s^{(k)}$.

$$V_s^{(k)} = -(Y_{sp}Y_{ps})^{-1}Y_{sp}Y_{pp}V_p^{(k)} + (Y_{sp}Y_{ps})^{-1}Y_{sp}I_{ps}^{(k)} \quad (47)$$

For a zero-impedance branch, $V_s^{(k)}$ can be computed as:

$$V_s^{(k)} = C_{p\to s}^V V_p^{(k)} \quad (48)$$

The backward/forward sweeps can be iteratively executed, until the tolerable residual active and reactive power mismatches and phase to ground voltage mismatch are obtained:

$$\left|P^{IBL(k)} - P^{IBL(k-1)}\right| \le \epsilon^P \quad (49a)$$

$$\left|Q^{IBL(k)} - Q^{IBL(k-1)}\right| \le \epsilon^Q \quad (49b)$$

$$\max_{s,\varphi}\left|\text{real}\left(V_s^{\varphi(k)} - V_s^{\varphi(k-1)}\right)\right| \le \epsilon^{VR} \quad (49c)$$

$$\max_{s,\varphi}\left|\text{imag}\left(V_s^{\varphi(k)} - V_s^{\varphi(k-1)}\right)\right| \le \epsilon^{VX} \quad (49d)$$

$\epsilon^P$, $\epsilon^Q$, $\epsilon^{VR}$ and $\epsilon^{VX}$ are the tolerable thresholds for residual active and reactive power mismatches and real and imaginary parts of phase to ground voltage mismatches.

The component-based method, such as backward/forward sweep algorithm is easy to implement, however its convergency heavily depends on the initial settings for voltages and residual powers.

System Based Analysis Method for Load Flow with Distributed Slack Buses

The load flows of distribution systems with distributed slack buses can also be solved using system-based load flow method in which each phase of every bus is modeled as a node, except the common phases of a common bus between a zero-impedance branch and a chosen adjacent impedance branch. The adjacent impedance branch is chosen as the one among all connected to zero-impedance branch that has more or equal phases connected to the common bus than the zero-impedance branch.

A nodal admittance matrix is formed to represent the relationship between the nodal injected currents with nodal voltages by integrating branch nodal admittance matrix together for all non-zero impedance branches including ones merged by zero-impedance branches and chosen adjacent impedance branches. The grounding impedances, constant impedance loads and capacitors are all treated as nodal self-admittances to be considered in the nodal admittance matrix.

With given nodal admittance matrix, the load flows are represented by a set of nodal active and reactive power balance equations and one more uncertain power imbalance equations for the whole system. The undetermined variables for the load flows are the nodal voltage magnitudes and angles for all phases of every bus, except the phases of one reference bus that are given, and the system power imbalances including active power imbalance and reactive power imbalance.

The nodal power balance equation for phase φ of bus s can be described in complex format as (50a), or individual active power and reactive formats as (50b) and (50c):

$$f^S = S_s^{INJ,\varphi} - S_s^{CAL,\varphi} = 0, s \in N', \varphi \in \Phi_s' \quad (50a)$$

$$f^P = P_s^{INJ,\varphi} - O_s^{CAL,\varphi} = 0, s \in N', \varphi \in \Phi_s' \quad (50b)$$

$$f^Q = Q_s^{INJ,\varphi} - Q_s^{CAL,\varphi} = 0, s \in N', \varphi \in \Phi_s' \quad (50c)$$

where:

N' is the set of modelled buses in the system, which do not include the reference bus, and common buses between the zero-impedance branches and non-zero impedance branches with same phase set. $\Phi_s'$ is set of the modeled phases for bus s. For the common bus s between the zero-impedance branches and chosen non-zero impedance branches, $\Phi_s'$ only contain unmatched phases of the non-zero impedance branch between two sides of the common bus.

$S_s^{INJ,\varphi}$ is the injected power of phase φ of bus s, converted from corresponding generations, constant-power and constant-current load components between phases at bus s:

$$S_s^{INJ,\varphi} = \sum_{\varphi'\varphi'' \in \Phi^{PAI}} C_{\varphi'\varphi'' \to \varphi}^I(\varphi)(SG_s^{\varphi'\varphi''} - SD_s^{CP,\varphi'\varphi''} - SD_s^{CI,\varphi'\varphi''}) \quad (51)$$

$S_s^{INJ,\varphi}$ can further be decomposed into active power component $P_i^{INJ,\varphi}$ and reactive power component $Q_i^{INJ,\varphi}$ defined as:

$$S_s^{INJ,\varphi} = P_s^{INJ,\varphi} + jQ_s^{INJ,\varphi} \quad (52)$$

$$P_s^{INJ,\varphi} = \sum_{\varphi'\varphi'' \in \Phi^{PAIR}} C_{\varphi'\varphi''}^I(\varphi) \quad (53)$$

$$\left(PG_s^{SCH,\varphi\varphi'} + \alpha_s^{P,\varphi\varphi'}P^{IBL} - PD_s^{CP,\varphi\varphi'} - \frac{|V_s^{\varphi\varphi'}|}{|V_s^{Rtd,\varphi\varphi'}|}PD_s^{CI,\varphi\varphi'}\right)$$

$$Q_s^{INJ,\varphi} = \sum_{\varphi'\varphi'' \in \Phi^{PAIR}} C_{\varphi'\varphi''}^I(\varphi)\left(QG_s^{SCH,\varphi\varphi'} + \gamma_s^{P,\varphi\varphi'}Q^{IBL} + \right. \quad (54)$$

$$\left. \beta_s^{Q,\varphi'\varphi''}(|V_s^{\varphi'\varphi^-}| - |V_s^{SCH,\varphi'\varphi''}|) - QD_s^{CP,\varphi\varphi'} - \frac{|V_s^{\varphi\varphi'}|}{|V_s^{Rtd,\varphi\varphi'}|}QD_s^{CI,\varphi\varphi'}\right)$$

where, $V_s^{\varphi\varphi'} = V_s^{\varphi} - V_s^{\varphi'} =$ $$(|V_s^{\varphi}| \cos V_s^{\varphi} - |V_s^{\varphi'}| \cos V_s^{\varphi'}) + j(|V_s^{\varphi}| \sin V_s^{\varphi} - |V_s^{\varphi'}| \sin V_s^{\varphi'}),$$

$$V_s^{\varphi} = |V_s^{\varphi}| \cos |V_s^{\varphi}| + j|V_s^{\varphi}| \sin V_s^{\varphi}.$$

$S_s^{CAL,\varphi}$ is the calculated nodal powers including active and reactive power components that derived from nodal admittances and nodal voltages:

$$S_s^{CAL,\varphi} = P_s^{CAL,\varphi} + jQ_s^{CAL,\varphi} \quad (55)$$

$$P_s^{CAL,\varphi} = \sum_{t \in N'} \sum_{\varphi' \in \Phi_t'} |V_s^{\varphi}||V_t^{\varphi'}|\left(G_{st}^{\varphi\varphi'} \cos \theta_{st}^{\varphi\varphi'} + B_{st}^{\varphi\varphi'} \sin \theta_{st}^{\varphi\varphi'}\right) \quad (56)$$

$$Q_s^{CAL,\varphi} = \sum_{t \in N'} \sum_{\varphi' \in \Phi_t'} |V_s^{\varphi}||V_k^{\varphi'}|\left(G_{st}^{\varphi\varphi'} \sin \theta_{st}^{\varphi\varphi'} - B_{st}^{\varphi\varphi'} \cos \theta_{st}^{\varphi\varphi'}\right) \quad (57)$$

where, $Y_{st}^{\varphi\varphi'} = G_{st}^{\varphi\varphi'} + jB_{st}^{\varphi\varphi'}$, $Y_{st}^{\varphi\varphi'}$ is the admittance element of nodal admittance matrix at the row corresponding to bus s phase φ and the column corresponding to bus t phase φ'. $\theta_{st}^{\varphi\varphi'} = \theta_s^{\varphi} - \theta_t^{\varphi'}$.

The equation for system power imbalances, i.e., active and reactive power imbalance is described as:

$$f^{P-IBL} = P^{IBL} - P^{CAL,IBL} = 0 \quad (58a)$$

$$f^{Q-IBL} = Q^{IBL} - Q^{CAL,IBL} = 0 \quad (58b)$$

$P^{CAL,IBL}$ and $Q^{CAL,IBL}$ are the calculated active and reactive power imbalances derived from nodal admittance matrix and nodal voltages as:

$$P^{CAL,IBL} = \sum_{s \in N' \cup N^R} \sum_{\varphi \in \Phi_s'} \sum_{t \in N' \cup N^R} \sum_{\varphi' \in \Phi_t'} |V_s^{\varphi}| \quad (59a)$$

$$|V_t^{\varphi'}|\left(G_{st}^{\varphi\varphi'} \cos \theta_{st}^{\varphi\varphi'} + B_{st}^{\varphi\varphi'} \sin \theta_{st}^{\varphi\varphi'}\right)$$

$$Q^{CAL,IBL} = \sum_{s \in N' \cup N^R} \sum_{\varphi \in \Phi_s'} \sum_{t \in N' \cup N^R} \sum_{\varphi' \in \Phi_t'} |V_s^{\varphi}| \quad (59b)$$

$$|V_t^{\varphi'}|\left(G_{st}^{\varphi\varphi'} \sin \theta_{st}^{\varphi\varphi'} - B_{st}^{\varphi\varphi'} \cos \theta_{st}^{\varphi\varphi'}\right)$$

In summary, the load flows can be determined by solving a set of nonlinear equations as:

$$f^P(X) = P^{INJ}(X) - P^{CAL}(X) = 0 \quad (60a)$$

$$f^Q(X) = Q^{INJ}(X) - Q^{CAL}(X) = 0 \quad (60b)$$

-continued $$f^{P-IBL}(X) = P^{IBL}(X) - P^{CAL,IBL}(X) = 0 \quad (60c)$$

$$f^{Q-IBL}(X) = Q^{IBL}(X) - Q^{CAL,IBL}(X) = 0 \quad (60d)$$

where X is the vector of variables, $$X = \begin{bmatrix} |V| \\ \theta \\ P^{IBL} \\ Q^{IBL} \end{bmatrix},$$

|V| is the vector of voltage magnitudes to be determined, θ is the vector of phase angles to be determined, $P^{IBL}$ and $Q^{IBL}$ are the unknown variables for active and reactive power imbalances. $f^P(X)$, $f^Q(X)$, $f^{P-IBL}(X)$ and $f^{Q-IVL}(X)$ are the set of active power balances, reactive power balances, active power imbalances and reactive power imbalances in term of functions of X. Equations (60a)-(60c) can be solved using Newton-Raphson algorithm using the following equations:

$$\begin{bmatrix} f^P(X) \\ f^Q(X) \\ f^{P-IBL} \\ f^{Q-IBL} \end{bmatrix} = -J\Delta X = -J \begin{bmatrix} \Delta|V| \\ \Delta\theta \\ \Delta P^{IBL} \\ \Delta Q^{IBL} \end{bmatrix} \quad (61)$$

where $$\Delta X = \begin{bmatrix} \Delta|V| \\ \Delta\theta \\ \Delta P^{IBL} \\ \Delta Q^{IBL} \end{bmatrix}$$

is the vector of increment deviations of variable X, J is a Jacobian matrix to represent the sensitivies of power balances and power imbalances with respect to nodal voltages, nodal phase angles, active power imbalance and reactive power imbalance defined as:

$$J = \begin{bmatrix} \frac{\partial f^P}{\partial |V|} & \frac{\partial f^P}{\partial \theta} & \frac{\partial f^P}{\partial P^{IBL}} & \frac{\partial f^P}{\partial Q^{IBL}} \\ \frac{\partial f^Q}{\partial |V|} & \frac{\partial f^Q}{\partial \theta} & \frac{\partial f^Q}{\partial P^{IBL}} & \frac{\partial f^Q}{\partial Q^{IBL}} \\ \frac{\partial f^{P-IBL}}{\partial |V|} & \frac{\partial f^{P-IBL}}{\partial \theta} & \frac{\partial f^{P-IBL}}{\partial P^{IBL}} & \frac{\partial f^{P-IBL}}{\partial Q^{IBL}} \\ \frac{\partial f^{Q-IBL}}{\partial |V|} & \frac{\partial f^{Q-IBL}}{\partial \theta} & \frac{\partial f^{Q-IBL}}{\partial P^{IBL}} & \frac{\partial f^{Q-IBL}}{\partial Q^{IBL}} \end{bmatrix} \quad (62)$$

The variable incremental changes are determined using the inverse of Jacobian matrix as shown in (63), and then the variables can be updated with the determined incremental changes for the variables as shown in (64). The final solution can be obtained when a converge criterion of variables are met.

$$\begin{bmatrix} \Delta|V| \\ \Delta\theta \\ \Delta P^{IBL} \\ \Delta Q^{IBL} \end{bmatrix} = -J^{-1} \begin{bmatrix} f^P(X) \\ f^Q(X) \\ f^{P-IBL} \\ f^{P-IBL} \end{bmatrix} \quad (63)$$

$$\begin{bmatrix} |V|^{(k)} \\ \theta^{(k)} \\ P^{IBL(k)} \\ Q^{IBL(k)} \end{bmatrix} = \begin{bmatrix} |V|^{(k-1)} \\ \theta^{(k-1)} \\ P^{IBL(k-1)} \\ Q^{IBL(k-1)} \end{bmatrix} + \begin{bmatrix} \Delta|V| \\ \Delta\theta \\ \Delta P^{IBL} \\ \Delta Q^{IBL} \end{bmatrix} \quad (64)$$

The system-based method, such as Newton-Raphson algorithm has good convergence characteristics, however a heavy computation is required for repeatedly computing the inverse of Jacobian matrix.

Hybrid System-based and Component-based Load Flow Algorithm with Distributed Slack Buses To overcome the disadvantages of component-based and system-based algorithm, some example embodiments provide a hybrid system-based and component-based algorithm.

Figure 9A:
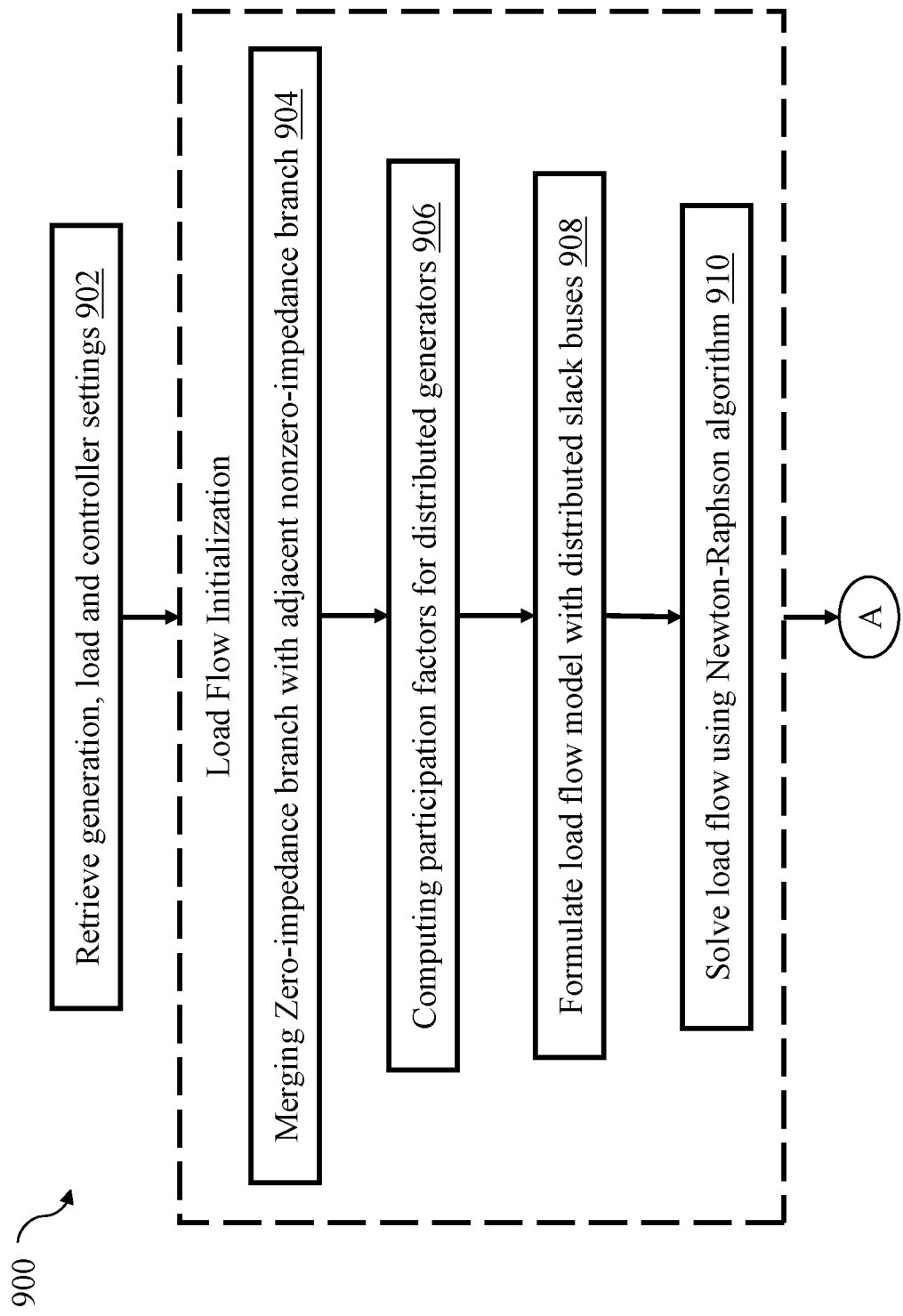
FIGS. 9A and 9B jointly illustrate the steps of a method for load flow analysis for a hybrid 3-wire and 4-wire distribution systems with distributed slack buses, according to some example embodiments.
Figure 9B:
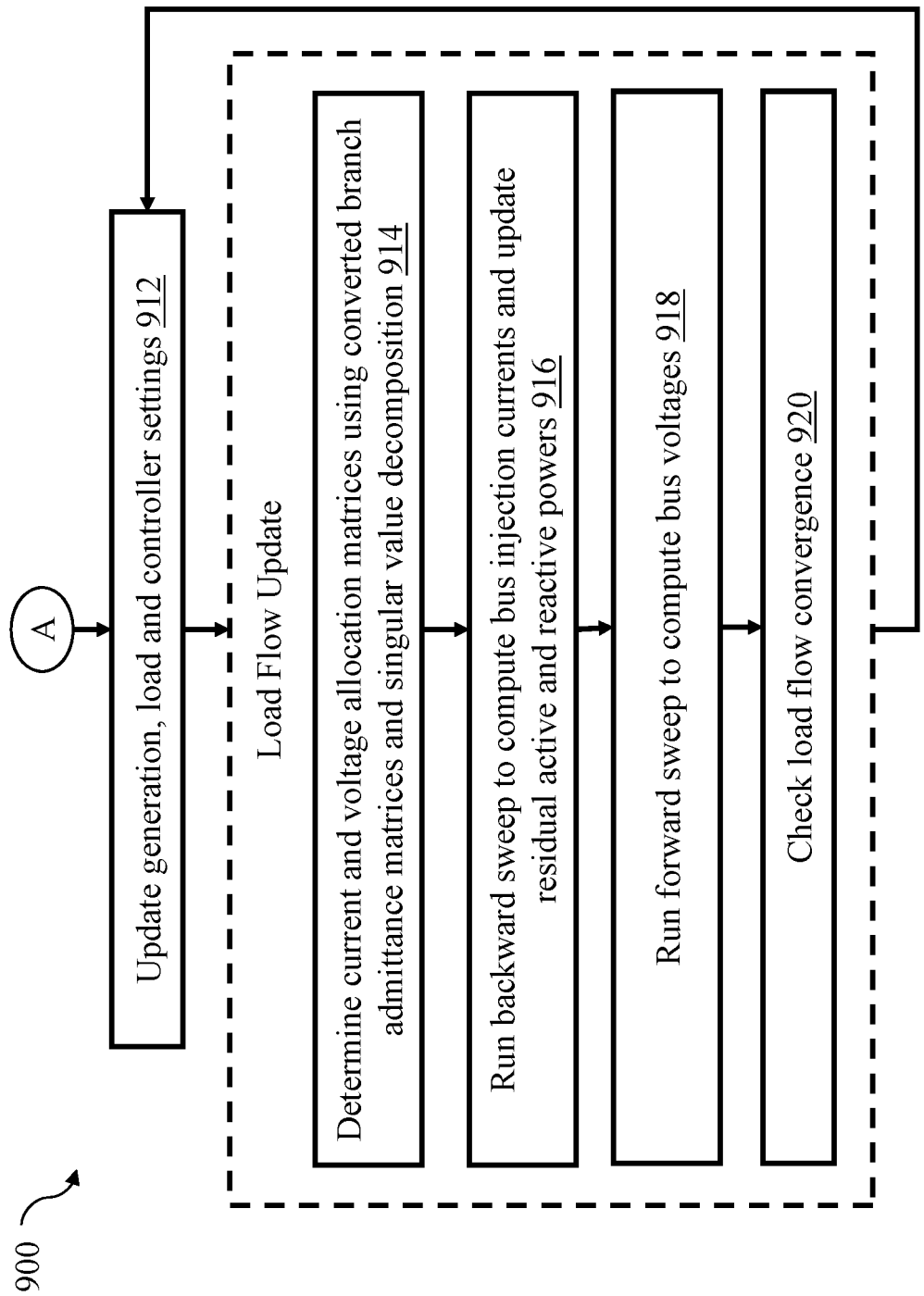

FIGS. 9A and 9B jointly illustrate the steps and convergence example of a method 900 for load flow analysis for a hybrid 3-wire and 4-wire distribution system with distributed slack buses, according to some example embodiments. The load flow analysis includes steps 902-910 for load flow initialization, and steps 912-920 for load flow update. The method 900 comprises retrieving scheduled generation, load and controller settings 902. According to some example embodiments, the retrieval of the data at step 902 may be performed in the manner described with reference to step 202 of FIG. 2. Zero-impedance branch are then merged 904 with adjacent nonzero-impedance branch and participation factors for distributed generators are computed 906. The load flow initialization then proceeds to step 908 where the load flow model is formulated with distributed slack buses and the load flow equations for the system with distributed slack buses are solved 910 using Newton-Raphson algorithm. Using the solution of the load flow equations, the generation, load and controller settings are updated 912 and the method 900 proceeds to load flow update.

At step 914, the method 900 comprises determining current and voltage allocation matrices based on branch nodal admittance matrices and singular value decomposition as described with equations (5)-(6), (20)-(21) and (7)-(9). Thereafter, backward sweep is run to compute bus injection currents and residual active and reactive powers are updated 916 and forward sweep is run to compute bus voltages 918. The convergence of load flow is then checked at 920 and the control of steps passes back to step 912 to update the generation, load and controller settings if the convergence criteria are not met. If the convergence criteria are met, the method terminates and outputs the load flow results. The convergence check of load flow may be performed by using maximal voltage mismatches for all nodes between two iterations.

FIG. 9C illustrates one convergence example of the method 900 for load flow analysis for a hybrid 3-wire and 4-wire distribution system with distributed slack buses, according to some example embodiments. As is shown in FIG. 9C the convergence process is for solving load flow of the exemplar system as shown in FIG. 8. In the solution, the maximum real and imaginary voltage mismatches between two consecutive iterations are used to check load flow convergence. Given the tolerable voltage mismatch is 0.0025 per unit, when backward/forward sweeps are executed 19 times, the maximum voltage mismatches are below tolerable limits, it is then considered that the load flow converged at iteration 19 of FIG. 9C.

In this way, the load flow analysis method for hybrid 3-wire and 4-wire distribution systems with distributed slack buses provides power distribution systems with the capability of analyzing load flow so as to detect the occurrence of system emergence events in a timely manner. This in turn helps deployment of appropriate corrective actions in a timely manner as well, thereby leading to prevention of breakdown of system equipment. Since the load flow analysis leads to corrective actions that can alter power production and/or consumption, the overall efficiency of power distribution is greatly optimized.

Figure 10:
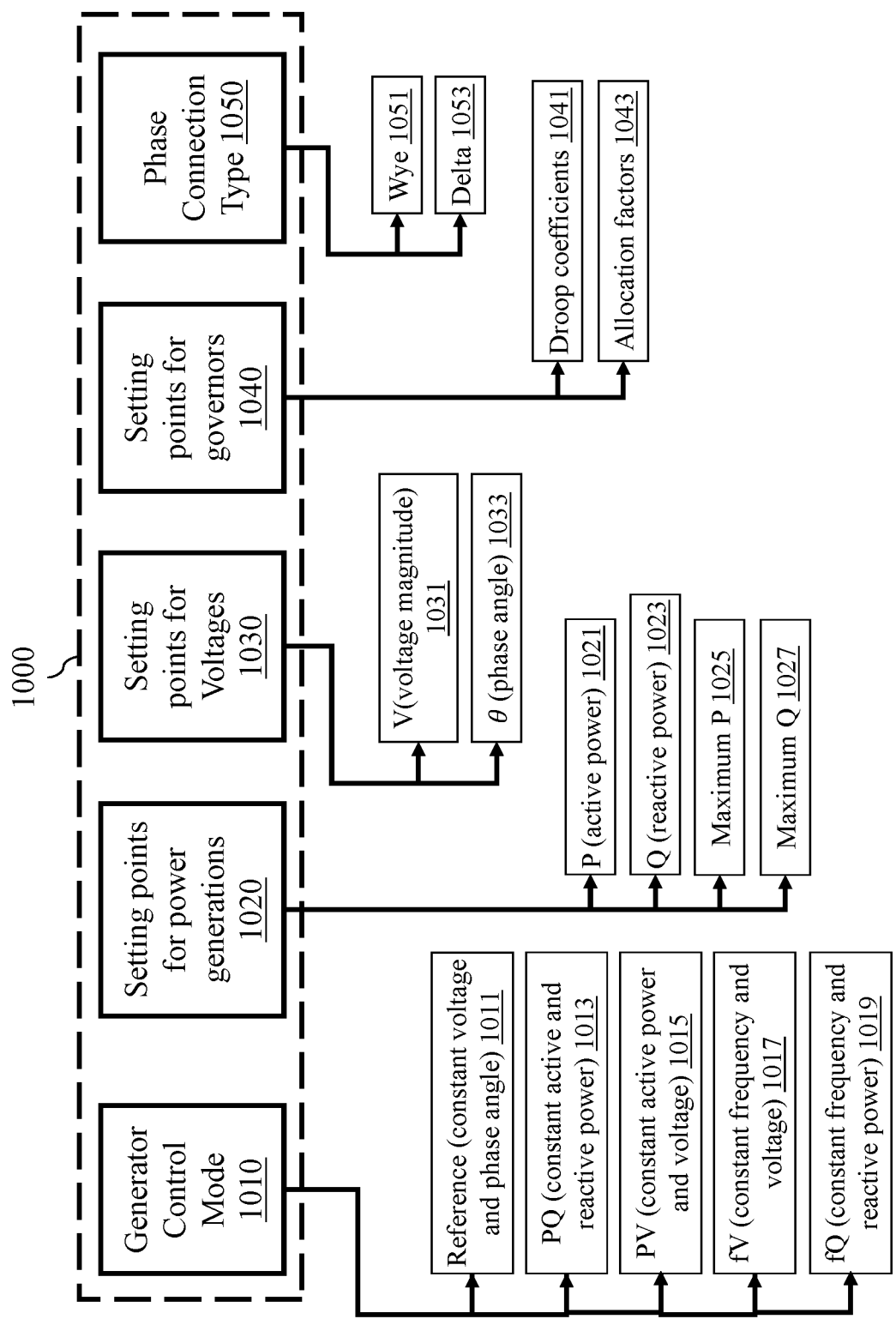
FIG. 10 illustrates some parameters utilized for power generation by one or more power sources and that are considered for load flow analysis for the power distribution system, according to some example embodiments.

FIG. 10 illustrates some parameters 1000 utilized for power generation by one or more power sources and that are considered for load flow analysis for the power distribution system, according to some example embodiments. The parameters 1000 include generator control mode 1010, setting points for power generations 1020, setting points for voltages 1030, setting points for governors 1040, and phase connection type 1050. Generation control mode 1010 further includes reference values (constant voltage and phase angle) 1011, PQ values (constant active and reactive power) 1013, PV values (constant active power and voltage) 1015, fV (constant frequency and voltage) 1017, and fQ (constant frequency and reactive power) 1019. The setting points for power generations 1020 include the active power (P) 1021, the reactive power (Q) 1023, maximum value of P 1025, and maximum value of Q 1027. The setting points for voltages 1030 include voltage magnitude (V) 1031 and phase angle (θ) 1033. The setting points for governors 1040 include droop coefficients 1041 and allocation factors 1043. The phase connection type 1050 may be Wye 1051 or Delta 1053.

Figure 11:
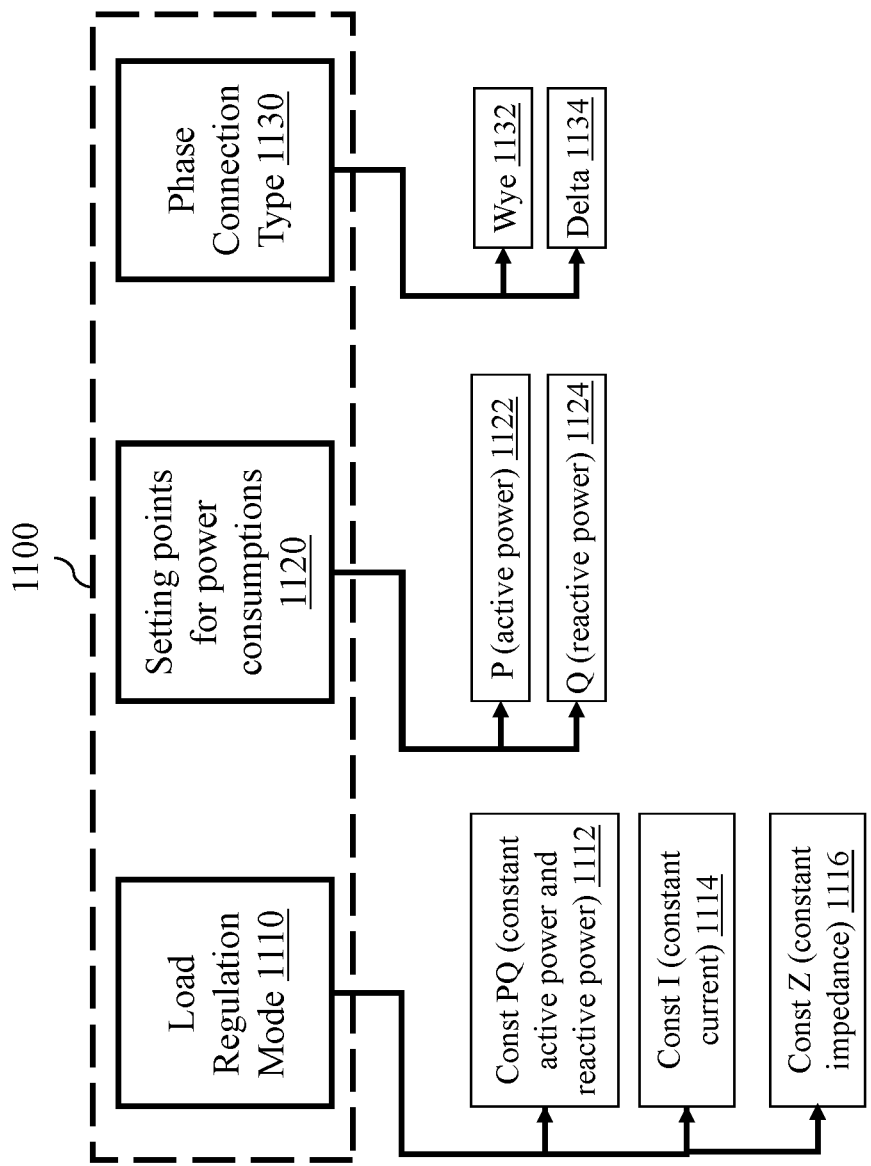
FIG. 11 illustrates some parameters describing load demands of one or more loads and that are considered for load flow analysis for the power distribution system, according to some example embodiments.

FIG. 11 illustrates some parameters 1100 describing load demands of one or more loads and that are considered for load flow analysis for the power distribution system, according to some example embodiments. The parameters 1100 include load regulation mode 1110, setting points for power consumptions 1120, and phase connection type 1130. The load regulation mode 1110 includes constant active power and reactive power (Const PQ) 1112, constant current (Const I) 1114, and constant impedance (Const Z) 1116. The setting points for power consumptions 1120 include active power (P) 1122 and reactive power (Q) 1124. The phase connection type 1130 may be Wye 1132 or Delta 1134.

Figure 12:
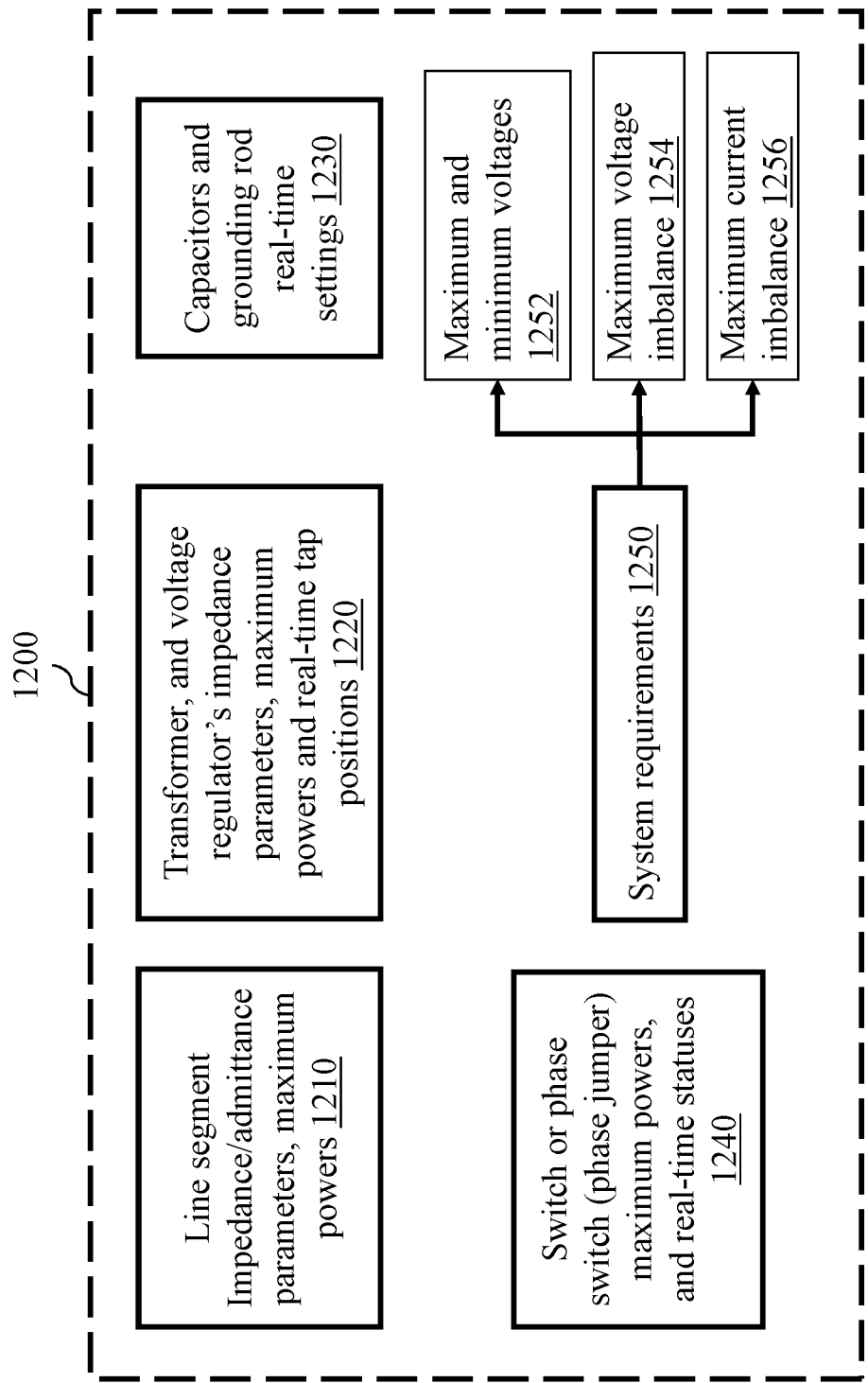
FIG. 12 illustrates some parameters describing the distribution network and that are considered for load flow analysis for the power distribution system, according to some example embodiments.

FIG. 12 illustrates some parameters 1200 describing the distribution network and that are considered for load flow analysis for the power distribution system, according to some example embodiments. The parameters for distribution network 1200 include line segment impedance/admittance parameters and maximum powers 1210, transformer, and voltage regulator's impedance parameters, maximum powers and real-time tap positions 1220, capacitors and grounding rod real-time settings 1230, switch or phase switch (phase jumper) maximum powers, and real-time statuses 1240, and system requirements 1250. The system requirements 1250 include maximum and minimum voltages 1252, maximum voltage imbalance 1254, and maximum current imbalance 1256.

Figure 13:
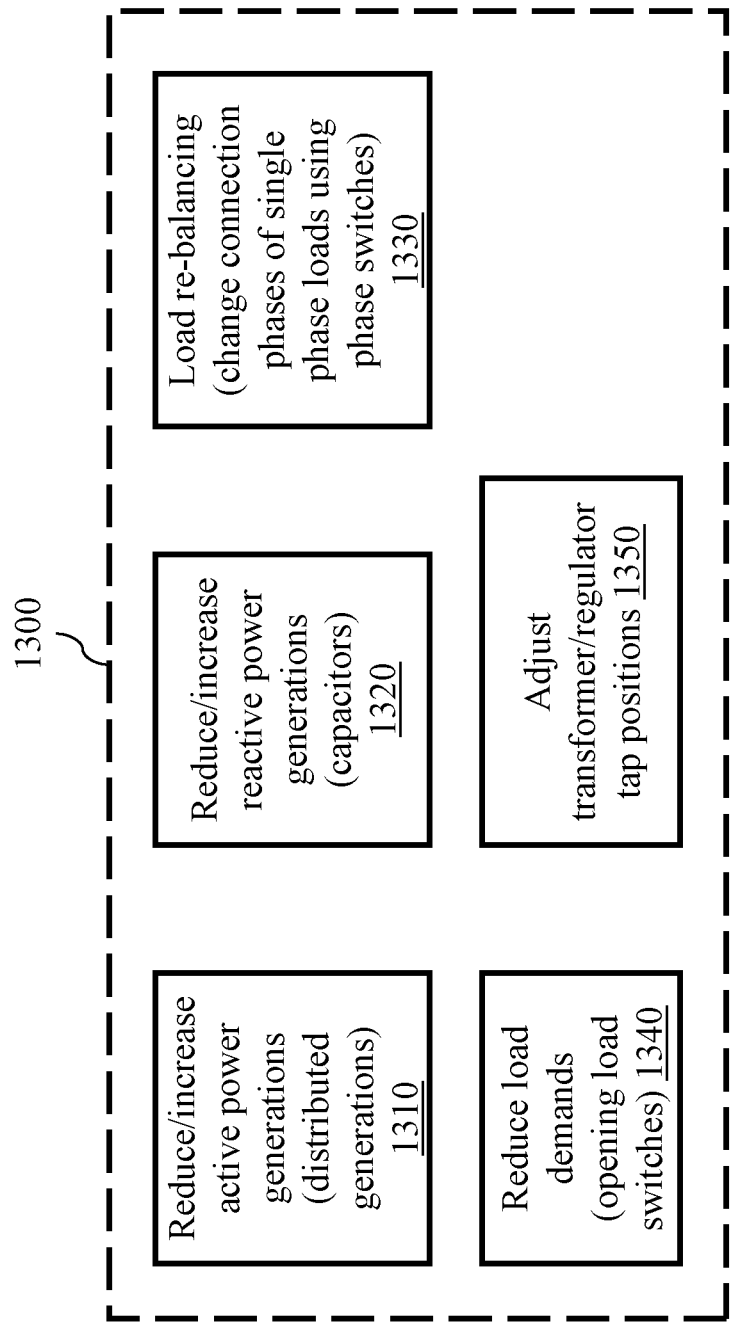
FIG. 13 illustrates some corrective actions implemented as a result of the load flow analysis for maintaining security of the power distribution system, according to some example embodiments.

FIG. 13 illustrates some corrective actions 1300 implemented as a result of the load flow analysis for maintaining security of the power distribution system, according to some example embodiments. The corrective actions 1300 comprise changing active power generations (distributed generations) 1310, changing reactive power generations (capacitors) 1320, load re-balancing (change connection phases of single-phase loads using phase switches) 1330, reducing load demands (opening load switches) 1340, and adjusting transformer/regulator tap positions 1350.

Figure 14:
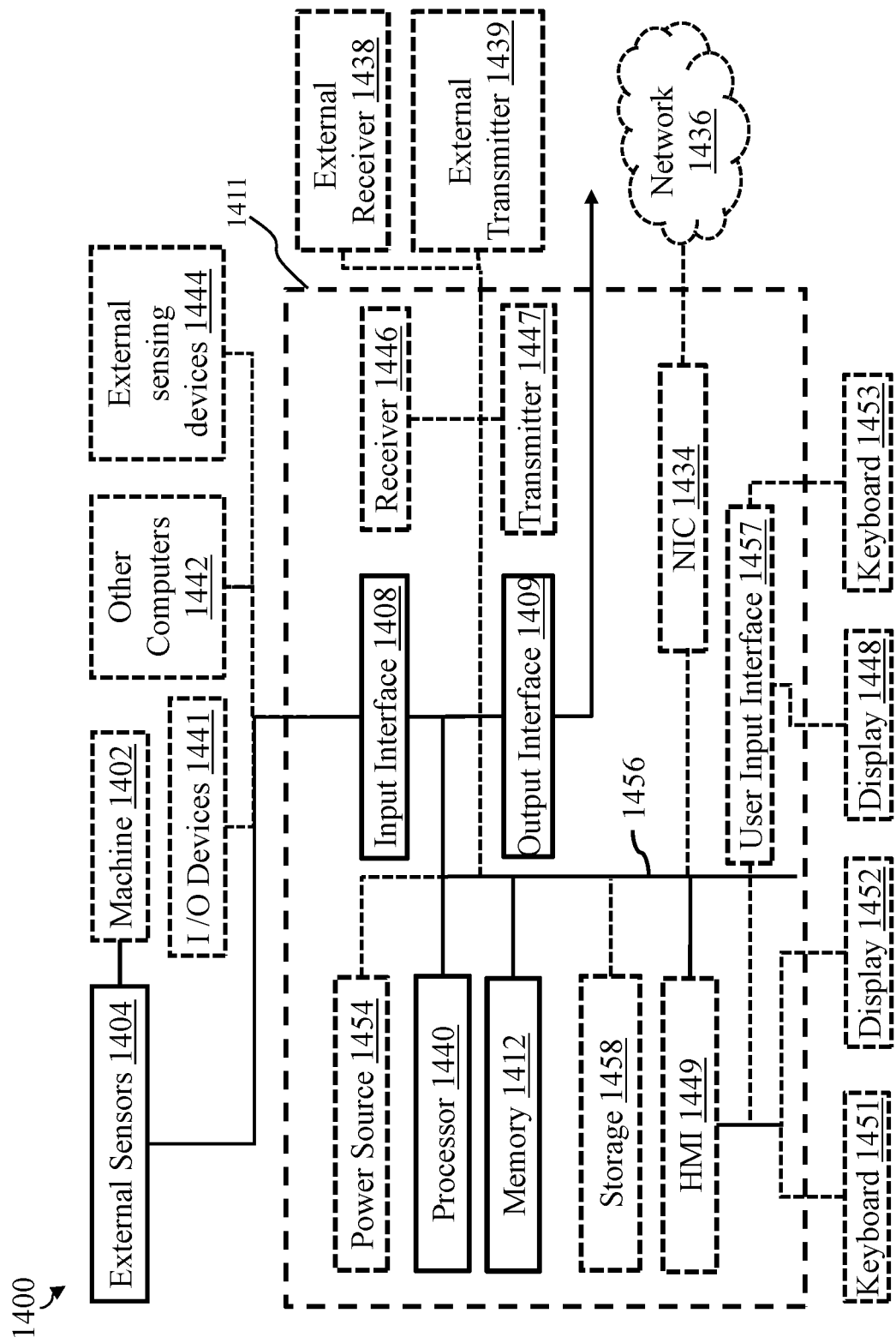
FIG. 14 illustrates a block diagram of a system for implementing the distribution control system, according to some example embodiments.

FIG. 14 illustrates a block diagram of a system 1400 for implementing some components of the distribution control system of FIG. 1A, according to some example embodiments. The component 1411 includes a processor 1440, a computer readable memory 1412, storage 1458 and user interface 1449 with optional display 1452 and keyboard 1451, which are connected through bus 1456. For example, the user interface 1449 in communication with the processor 1440 and the computer readable memory 1412, acquires and stores the data in the computer readable memory 1412 upon receiving an input from a surface, keyboard 1453, of the user interface 1457 by a user.

The component 1411 can include a power source 1454, depending upon the application the power source 1454 may be optionally located outside of the component 1411. Linked through bus 1456 can be a user input interface 1457 adapted to connect to a display device 1448, wherein the display device 1448 can include a computer monitor, camera, television, projector, or mobile device, among others. A network interface controller (NIC) 1434 is adapted to connect through the bus 1456 to a network 1436, wherein image data or other data, among other things, can be rendered on a third-party display device, third party imaging device, and/or third-party printing device outside of the component 1411.

Still referring to FIG. 14, electronic data, among other things, may be transmitted over a communication channel of the network 1436, and/or stored within the storage system 1458 for storage and/or further processing. Further, the time series data or other data may be received wirelessly or hard wired from a receiver 1446 (or external receiver 1438) or transmitted via a transmitter 1447 (or external transmitter 1439) wirelessly or hard wired, the receiver 1446 and transmitter 1447 are both connected through the bus 1456. The component 1411 may be connected via an input interface 1408 to external sensing devices 1444 and external input/output devices 1441. For example, the external sensing devices 1404 may include sensors gathering data before-during-after of the collected time-series data of the machine. The component 1411 may be connected to other external computers 1442. An output interface 1409 may be used to output the processed data from the processor 1440. It is noted that a user interface 1449 in communication with the processor 1440 and the non-transitory computer readable storage medium 1412, acquires and stores data in the non-transitory computer readable storage medium 1412 upon receiving an input from a surface of the user interface 1449 by a user.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements. Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks. Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A control system for controlling power flow in a power distribution system, comprising:
    circuitry configured to:
        receive input data comprising generation prediction data indicative of power generation by a plurality of power sources over a finite time horizon, load prediction data indicative of power consumption by a plurality of loads, and real-time device status data of one or more equipment in the power distribution system, wherein the power distribution system is a hybrid 3-wire and 4-wire three-phase power distribution system;
        generate scheduling data for scheduling power generation by one or more power sources of the plurality of power sources and for scheduling power consumption by one or more loads of the plurality of loads, based on the generation prediction data and the load prediction data;
        determine values of one or more system parameters including dispatched power generations, dispatched load demands, branch currents, and bus voltages for the power distribution system by executing an unbalanced load flow analysis for the power distribution system using the scheduling data and a network topology for the power distribution system determined by explicitly modelling neutral wires as phase wires and neutral groundings as equivalent grounding admittances, wherein the unbalanced load flow analysis utilizes a compact multi-bus based nodal admittance model to represent relationships between nodal injected currents and nodal voltages at a plurality of non-overlapped combination of buses and phases for a section formed by a zero impedance branch connected with impedance branches in the power distribution system;
        generate one or more commands for controlling the power distribution system, based on the determined values of the one or more system parameters; and
        control the power distribution system based on the generated one or more commands.

2. The control system of claim 1,
    wherein the power flow in the power distribution system is bi-directional, and
    wherein to execute the unbalanced load flow analysis the circuitry is configured to solve an initial load flow for the power distribution system using the scheduling data and the real-time device status data according to a system-based model.

3. The control system of claim 2,
    wherein the system-based model is based on nodal admittance matrix of the power distribution system,
    wherein the nodal admittance matrix is generated using an admittance matrix of each component and node in the network topology of the power distribution system, and
    wherein each branch having an energized phase is modelled as a node and each branch having branch impedance less than or equal to a threshold is modelled as a zero-impedance branch.

4. The control system of claim 3, wherein the nodal admittance for the zero-impedance branch is formulated by merging the zero-impedance branch with a corresponding adjacent non-zero impedance branch having a common terminal with the zero-impedance branch and phases presenting at the common terminal viewed from the non-zero branch include all phases presenting at the common terminal viewed from the zero-impedance branch.

5. The control system of claim 2, wherein to generate the one or more commands the circuitry is configured to update the initial load flow, based on a component-based model using the values of the one or more system parameters.

6. The control system of claim 5, wherein the component-based model is based on a representation of the power distribution system as a graph in which the plurality of buses are modelled as nodes of the graph and branches of the radial configuration are modelled as links of the graph, wherein the nodes of the graph are divided into a plurality of layers based on a number of branches connected to a root node, wherein one of the plurality of buses is modelled as the root node that belongs to a first layer of the plurality of layers.

7. The control system of claim 6, wherein to update the initial load flow, based on the component-based model the circuitry is configured to:
compute injected powers of nodes and power flows of branches that are connected to each layer starting from a last layer of the plurality of layers to the first layer of the plurality of layers by using latest voltages and global residual active and reactive powers determined at last iteration;
update global residual active and reactive power generations for the plurality of participated generators based on the computed power injections and power flows of nodes and branches at the first layer; and
compute a voltage magnitude and phase angle of each node connected to each layer starting from the root node towards nodes in the last layer using latest power flows and injections of nodes and branches.

8. The control system of claim 7,
wherein power flows on a branch between a first bus and a second bus having different number of phases for each other are computed based on corresponding currents entering into the branch through the first bus which are determined as a combination of weighted contribution of currents entering the branch through the second bus of the branch, and voltages at the second bus of the branch,
wherein the weights for current contributions are represented using a matrix determined based on self-admittance matrix of the first bus of the branch, mutual admittance matrix between the first bus and the second bus of the branch, and an inversion of a product of mutual admittance matrices between the first bus and the second, and between the second bus and the first bus of the branch, and
wherein the weights for voltage contributions are represented using a matrix determined based on self admittance matrices of the first bus, and the second bus of the branch, mutual admittance matrix between the first bus and the second bus of the branch, and an inversion of a product of mutual admittance matrices between the first bus and the second bus, and between the second bus and the first bus of the branch.

9. The control system of claim 7,
wherein voltages of a second bus of a branch between a first bus and the second bus having different number of phases for each other are computed as a combination of weighted contribution of currents entering the branch through the first bus of the branch, and voltages at the first bus of the branch,
wherein the weights for current contributions are represented using a matrix determined based on mutual admittance matrix between the second bus and the first bus of the branch, and an inversion of a product of mutual admittance matrices between the second bus and the first bus, and between the first bus and the second bus of the branch, and
wherein the voltage contributions are represented using a matrix determined based on self-admittance matrix of the first bus of the branch, mutual admittance matrix between the second bus and the first bus of the branch, and an inversion of a product of mutual admittance matrices between the second bus and the first bus, and between the first bus and the second bus of the branch.

10. The control system of claim 7, wherein the circuitry is further configured to check a convergence of load flow by using maximal voltage mismatches for all nodes between two iterations and generate the one or more commands based on determined branch currents, nodes voltages, load consumptions, and generation outputs.

11. The control system of claim 1, wherein the plurality of buses share global active and reactive power mismatches between the plurality of power sources, and wherein the circuitry is further configured to provide additional reactive needs satisfying voltage regulation needs of the plurality of power sources.

12. A computer-implemented method for controlling power flow in a power distribution system, the method comprising:
accepting input data comprising generation prediction data indicative of power generation by a plurality of power sources over a finite time horizon, load prediction data indicative of power consumption by a plurality of loads, and real-time device status data of one or more equipment in the power distribution system, wherein the power distribution system is a hybrid 3-wire and 4-wire three-phase power distribution system;
generating scheduling data for scheduling power generation by one or more power sources of the plurality of power sources and for scheduling power consumption by one or more loads of the plurality of loads, based on the generation prediction data and the load prediction data;
determining values of one or more system parameters including dispatched power generations, dispatched load demands, branch currents, and bus voltages for the power distribution system by executing an unbalanced load flow analysis for the power distribution system using the scheduling data and a network topology for the power distribution system determined by explicitly modelling neutral wires as phase wires and neutral groundings as equivalent grounding admittances, wherein the unbalanced load flow analysis utilizes a compact multi-bus based nodal admittance model to represent relationships between nodal injected currents and nodal voltages at a plurality of non-overlapped combinations of buses and phases for a section formed by zero impedance branch connected with impedance branches in the power distribution system;
generating one or more commands for controlling the power distribution system, based on the determined values of the one or more system parameters; and
controlling the power distribution system based on the generated one or more commands.

13. The computer-implemented method of claim 12,
wherein the power flow in the power distribution system is bi-directional, and
wherein executing the unbalanced load flow analysis comprises solving an initial load flow for the power distribution system using the scheduling data and the real-time device status data according to a system-based model.

14. The computer-implemented method of claim 13,
wherein the system-based model is based on nodal admittance matrix of the power distribution system, wherein the nodal admittance matrix is generated using an admittance matrix of each component and node in the network topology of the power distribution system, and wherein each branch having an energized phase is modelled as a node and each branch having branch impedance less than or equal to a threshold is modelled as a zero-impedance branch.

15. The computer-implemented method of claim 13, wherein generating the one or more commands comprises updating the initial load flow, based on a component-based model using the values of the one or more system parameters.

16. The computer-implemented method of claim 15, wherein the component-based model is based on a representation of a radial configuration of the power distribution system as a graph in which the plurality of buses are modelled as nodes of the graph and branches of the radial configuration are modelled as links of the graph, wherein the nodes of the graph are divided into a plurality of layers based on a number of branches connected to a root node, wherein one of the plurality of buses is modelled as the root node that belongs to a first layer of the plurality of layers.

17. The computer-implemented method of claim 16, wherein updating the initial load flow, based on the component-based model comprises:
   computing power injects of nodes and power flows of branches that connected to each compute injected powers of nodes and power flows of branches that are connected to each layer starting from a last layer of the plurality of layers to the first layer of the plurality of layers by using latest voltages and global residual active and reactive powers determined at last iteration;
   updating global residual active and reactive power generations for the plurality of participated generators based on the computed power injections and power flows of nodes and branches at the first layer; and
   computing a voltage magnitude and phase angle of each node connected to each layer starting from the root node towards nodes in the last layer using latest power flows and injections of nodes and branches.

18. A non-transitory computer readable medium having stored thereon computer-executable instructions which when executed by a computer, causes the computer to perform a method for controlling power flow in a power distribution system, the method comprising:
   accepting input data comprising generation prediction data indicative of power generation by a plurality of power sources over a finite time horizon, load prediction data indicative of power consumption by a plurality of loads, and real-time device status data of one or more equipment in the power distribution system, wherein the power distribution system is a hybrid 3-wire and 4-wire three-phase power distribution system;
   generating scheduling data for scheduling power generation by one or more of the plurality of power sources and for scheduling power consumption by one or more of the plurality of loads, based on the generation prediction data and the load prediction data;
   determining values of one or more system parameters including dispatched power generations, dispatched load demands, branch currents, and bus voltages for the power distribution system by executing an unbalanced load flow analysis for the power distribution system using the scheduling data and a network topology for the power distribution system determined by explicitly modelling neutral wires as phase wires and neutral groundings as equivalent grounding admittances, wherein the unbalanced load flow analysis utilizes a compact multi-bus based nodal admittance model to represent relationships between nodal injected currents and nodal voltages at a plurality of non-overlapped phases of buses for a section formed by zero impedance branch connected with impedance branches in the power distribution system;
   generating one or more commands for controlling the power distribution system, based on the determined values of the one or more system parameters; and
   controlling the power distribution system based on the generated one or more commands.

* * * * *